US012459089B2

(12) United States Patent
Zimmerman et al.

(10) Patent No.: US 12,459,089 B2
(45) Date of Patent: *Nov. 4, 2025

(54) POWERED FASTENER DRIVER

(71) Applicant: MILWAUKEE ELECTRIC TOOL CORPORATION, Brookfield, WI (US)

(72) Inventors: Jacob N. Zimmerman, Pewaukee, WI (US); Grace Whitmore, Palatine, IL (US); Marcus Wechselberger, Milwaukee, WI (US); Casey D. Garces, Milwaukee, WI (US); Mitchell T. Neuhoff, Waukesha, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/492,822

(22) Filed: Oct. 24, 2023

(65) Prior Publication Data

US 2024/0051102 A1 Feb. 15, 2024

Related U.S. Application Data

(63) Continuation of application No. 17/578,651, filed on Jan. 19, 2022, now Pat. No. 11,801,590, which is a (Continued)

(51) Int. Cl.
*B25C 1/00* (2006.01)

(52) U.S. Cl.
CPC .............. *B25C 1/005* (2013.01); *B25C 1/008* (2013.01)

(58) Field of Classification Search
CPC ........... B25C 1/00; B25C 1/008; B25C 1/005; B25C 5/06; B25C 5/1606
See application file for complete search history.

(56) References Cited

U.S. PATENT DOCUMENTS 4,687,126 A 8/1987 Brosius et al.
4,858,811 A 8/1989 Brosius et al.
(Continued)

FOREIGN PATENT DOCUMENTS

DE 2163557 C3 7/1972
EP 1539432 B1 8/2006
(Continued)

OTHER PUBLICATIONS

International Search Report and Written Opinion for Application No. PCT/US2021/025162 dated Jul. 26, 2021 (10 pages).

*Primary Examiner* — Praachi M Pathak
(74) *Attorney, Agent, or Firm* — Michael Best & Friedrich LLP

(57) ABSTRACT

A fastener driver includes a pusher assembly slidably coupled to a magazine assembly. The pusher assembly includes a first portion and a second portion that are selectively movable relative to each other. The pusher assembly is adjustable between a first state in which the first portion and the second portion are configured to move together in unison toward the channel, and a second state in which the first portion moves relative to the second portion toward the channel. A dry-fire lockout assembly includes a blocking member coupled to the magazine assembly or the nosepiece assembly, and a lockout member selectively engageable with the blocking member for moving the blocking member from a first position and a second position. The pusher assembly is configured to transition from the first state to the second state after a predetermined number of fasteners remain in the magazine assembly.

20 Claims, 15 Drawing Sheets

Related U.S. Application Data continuation of application No. 17/219,044, filed on Mar. 31, 2021, now Pat. No. 11,260,512.

(60) Provisional application No. 63/040,761, filed on Jun. 18, 2020, provisional application No. 63/027,391, filed on May 20, 2020, provisional application No. 63/002,565, filed on Mar. 31, 2020.

(56) References Cited

U.S. PATENT DOCUMENTS

| | | | | |
|---|---|---|---|---|
| 6,199,739 | B1 * | 3/2001 | Mukoyama | B25C 1/008 227/120 |
| 6,267,284 | B1 | 7/2001 | Clark | |
| 6,592,014 | B2 | 7/2003 | Smolinski | |
| 6,966,477 | B1 | 11/2005 | Chien-Kuo et al. | |
| 7,134,586 | B2 * | 11/2006 | McGee | B25C 1/005 227/125 |
| 7,641,089 | B2 | 1/2010 | Schell et al. | |
| 8,006,883 | B2 | 8/2011 | Schell et al. | |
| 8,567,654 | B2 | 10/2013 | Wu et al. | |
| 8,690,036 | B2 | 4/2014 | Schell et al. | |
| 8,746,526 | B2 * | 6/2014 | Hlinka | B25C 1/008 227/8 |
| 11,034,005 | B2 * | 6/2021 | Suarez | B25C 5/1606 |
| 2003/0111239 | A1 * | 6/2003 | Smolinski | B25C 1/005 173/8 |
| 2006/0108390 | A1 | 5/2006 | Schnell et al. | |
| 2008/0023517 | A1 | 1/2008 | Wojcicki | |
| 2009/0039135 | A1 | 2/2009 | Kubo | |
| 2011/0062207 | A1 * | 3/2011 | Hlinka | B25C 1/008 227/8 |
| 2012/0085806 | A1 * | 4/2012 | Lee | B25C 1/008 227/8 |
| 2013/0299546 | A1 * | 11/2013 | Zhao | B25C 1/08 227/8 |
| 2014/0034700 | A1 | 2/2014 | Chang | |
| 2014/0252060 | A1 * | 9/2014 | Segura | B25C 1/008 227/8 |
| 2015/0053736 | A1 | 2/2015 | Pomeroy et al. | |
| 2018/0001453 | A1 | 1/2018 | Jaskot et al. | |
| 2019/0039219 | A1 * | 2/2019 | Suarez | B25C 5/1606 |
| 2019/0061196 | A1 | 2/2019 | Hung et al. | |
| 2019/0077000 | A1 | 3/2019 | Hung et al. | |
| 2019/0091845 | A1 | 3/2019 | Wyler et al. | |
| 2019/0217457 | A1 | 7/2019 | Hung et al. | |
| 2019/0299381 | A1 | 10/2019 | Hung | |
| 2019/0329390 | A1 | 10/2019 | Lin et al. | |
| 2020/0156226 | A1 * | 5/2020 | Peng | B25C 1/047 |

FOREIGN PATENT DOCUMENTS

| | | | |
|---|---|---|---|
| JP | H11320445 | A | 11/1999 |
| JP | 5015248 | B2 | 8/2012 |

* cited by examiner

POWERED FASTENER DRIVER

CROSS-REFERENCE TO RELATED APPLICATIONS

This application is a continuation of U.S. patent application Ser. No. 17/578,651 filed on Jan. 19, 2022, now U.S. Pat. No. 11,801,590, which is a continuation of U.S. patent application Ser. No. 17/219,044 filed on Mar. 31, 2021, now U.S. Pat. No. 11,260,512, which claims priority to U.S. Provisional Patent Application No. 63/040,761 filed on Jun. 18, 2020, U.S. Provisional Patent Application No. 63/027,391 filed on May 20, 2020, and U.S. Provisional Patent Application No. 63/002,565 filed on Mar. 31, 2020, the entire contents of all of which are incorporated herein by reference.

FIELD OF THE INVENTION

The present invention relates to powered fastener drivers.

BACKGROUND OF THE INVENTION

There are various fastener drivers known in the art for driving fasteners (e.g., nails, tacks, staples, etc.) into a workpiece. These fastener drivers operate utilizing various means known in the art (e.g., compressed air generated by an air compressor, electrical energy, a flywheel mechanism, etc.), but often these designs are met with power, size, and cost constraints.

SUMMARY OF THE INVENTION

The present invention provides, in one aspect, a fastener driver including a magazine assembly configured to receive fasteners, a nosepiece assembly including a channel from which consecutive fasteners from the magazine assembly are driven, and a pusher assembly slidably coupled to the magazine assembly. The pusher assembly is configured to bias the fasteners within the magazine assembly toward the channel. The pusher assembly includes a first portion and a second portion. The first portion and the second portion are selectively movable relative to each other. The pusher assembly is adjustable between a first state in which the first portion and the second portion are configured to move together in unison toward the channel, and a second state in which the first portion moves relative to the second portion toward the channel. A workpiece contact element is movable relative to the nosepiece assembly between an extended position and a retracted position. A dry-fire lockout assembly includes a blocking member coupled to the magazine assembly or the nosepiece assembly, and a lockout member selectively engageable with the blocking member for moving the blocking member from a first position in which the workpiece contact element is configured to slide past the blocking member, and a second position in which the blocking member inhibits movement of the workpiece contact element when a predetermined number of fasteners remain in the magazine assembly. The lockout member is integral with the second portion of the pusher assembly. The pusher assembly is configured to transition from the first state to the second state after the predetermined number of fasteners remain in the magazine assembly.

The present invention provides, in another aspect, a fastener driver including a magazine assembly configured to receive fasteners, a nosepiece assembly including a channel from which consecutive fasteners from the magazine assembly are driven, and a pusher assembly slidably coupled to the magazine assembly. The pusher assembly is configured to bias the fasteners within the magazine assembly toward the channel. The pusher assembly includes a first portion and a second portion. The first portion and the second portion are selectively movable relative to each other. The pusher assembly is adjustable between a first state in which the first portion and the second portion are configured to move together in unison toward the channel, and a second state in which the first portion moves relative to the second portion toward the channel. A workpiece contact element is movable relative to the nosepiece assembly between an extended position and a retracted position. A dry-fire lockout assembly includes a blocking member coupled to the magazine assembly or the nosepiece assembly and a lockout member selectively engageable with the blocking member for moving the blocking member from a first position in which the workpiece contact element is configured to slide past the blocking member, and a second position in which the blocking member inhibits movement of the workpiece contact element when a predetermined number of fasteners remain in the magazine assembly. A first spring is configured to bias the blocking member toward the first position. The lockout member is integral with the second portion of the pusher assembly. The pusher assembly is configured to transition from the first state to the second state when the blocking member is in an intermediate position between the first position and the second position and after the predetermined number of fasteners remain in the magazine assembly.

The present invention provides, in another aspect, a pusher assembly for a fastener driver. The pusher assembly is configured to bias fasteners within a magazine assembly toward a channel of a nosepiece assembly. The pusher assembly includes a first portion configured to contact the fasteners within the magazine. A second portion is selectively movable with the first portion. A first spring has an end coupled to the first portion. A second spring has an end coupled to the second portion. The pusher assembly is adjustable between a first state in which the first portion and the second portion are configured to move together in unison toward the channel, and a second state in which the first portion is configured to move relative to the second portion toward the channel. Each of the first spring and the second spring is configured to bias the first portion and the second portion, respectively, toward the channel independent of each other. The pusher assembly is in the first state if a number of fasteners in the magazine assembly is equal to or more than a predetermined number of fasteners remaining in the magazine assembly. The pusher assembly is adjustable from the first state to the second state after the predetermined number of fasteners remain in the magazine assembly.

The present invention provides, in another aspect, a fastener driver including a magazine assembly configured to receive fasteners, a nosepiece assembly including a channel from which consecutive fasteners from the magazine assembly are driven, and a pusher assembly slidably coupled to the magazine assembly. The pusher assembly is configured to bias the fasteners within the magazine assembly toward the channel. The pusher assembly includes a first portion and a second portion selectively coupled for movement with the first portion. The pusher assembly is adjustable between a first state in which the first portion and the second portion are coupled for movement together toward the channel, and a second state in which the first portion moves relative to the second portion toward the channel. The fastener driver also includes a workpiece contact element movable relative to the nosepiece assembly between an extended position and a retracted position, and a dry-fire lockout assembly. The dry-fire lockout assembly includes a blocking member coupled to the magazine assembly, and a lockout member selectively engageable with the blocking member for moving the blocking member from a first position in which the workpiece contact element is configured to slide past the blocking member, and a second position in which the blocking member inhibits movement of the workpiece contact element when a predetermined number of fasteners remain in the magazine assembly. The lockout member is integral with the second portion of the pusher assembly. The pusher assembly is configured to transition from the first state to the second state after the predetermined number of fasteners remain in the magazine assembly.

The present invention provides, in another aspect, a fastener driver including a magazine assembly having a fastener channel extending along a length thereof and configured to receive fasteners, and a window positioned on a side of the magazine assembly. The fastener driver also includes a nosepiece assembly including a channel from which consecutive fasteners from the magazine assembly are driven and a pusher assembly slidably positioned in the fastener channel. The pusher assembly is configured to bias the fasteners within the magazine assembly toward the channel. The pusher assembly includes a first portion and a second portion selectively coupled for movement with the first portion. The pusher assembly is adjustable between a first state in which the first portion and the second portion are coupled for movement together toward the channel, and a second state in which the first portion moves relative to the second portion toward the channel. A workpiece contact element is movable relative to the nosepiece assembly between an extended position and a retracted position. A dry-fire lockout assembly includes a blocking member coupled to the magazine assembly. An end portion of the blocking member is selectively receivable within the window. The end portion is biased by a spring toward the fastener channel and away from the window. The dry-fire lockout assembly also includes a lockout member selectively engageable with the blocking member for moving the blocking member from a first position in which the workpiece contact element is configured to slide past the blocking member, and a second position in which the end portion of the blocking member is positioned in the window to inhibit movement of the workpiece contact element when a predetermined number of fasteners remain in the magazine assembly. The lockout member is integral with the second portion of the pusher assembly. The pusher assembly is configured to transition from the first state to the second state after the predetermined number of fasteners remain in the magazine assembly.

The present invention provides, in yet another aspect, a fastener driver including a magazine assembly configured to receive fasteners, a nosepiece assembly including a channel from which consecutive fasteners from the magazine assembly are driven, and a pusher assembly slidably coupled to the magazine assembly. The pusher assembly is configured to bias the fasteners within the magazine assembly toward the channel. The pusher assembly includes a first portion and a second portion movably coupled to the first portion. The pusher assembly is adjustable between a first state in which the first portion and the second portion are configured to move together in unison toward the channel, and a second state in which the first portion moves relative to the second portion toward the channel. A workpiece contact element is movable relative to the nosepiece assembly between an extended position and a retracted position. A dry-fire lockout assembly includes a blocking member coupled to the nosepiece assembly, and a lockout member selectively engageable with the blocking member for moving the blocking member from a first position in which the workpiece contact element is configured to slide past the blocking member, and a second position in which the blocking member inhibits movement of the workpiece contact element when a predetermined number of fasteners remain in the magazine assembly. The lockout member is integral with the second portion of the pusher assembly. The pusher assembly is configured to transition from the first state to the second state after the predetermined number of fasteners remain in the magazine assembly.

The present invention provides, in another aspect, a fastener driver including a magazine assembly having a fastener channel extending along a length thereof and configured to receive fasteners, a nosepiece assembly including a channel from which consecutive fasteners from the magazine assembly are driven, and a pusher assembly slidably coupled to the magazine assembly. The pusher assembly is configured to bias the fasteners within the magazine assembly toward the channel. The pusher assembly includes a first portion having a body defining a window. The body is slidably positioned in the fastener channel. The pusher assembly also includes a second portion movably positioned within the window of the first portion and a first spring extending between a first wall of the window and the second portion. The pusher assembly is adjustable between a first state in which the first portion and the second portion are configured to move together in unison toward the channel, and a second state in which the first portion moves relative to the second portion toward the channel. A workpiece contact element is movable relative to the nosepiece assembly between an extended position and a retracted position. A dry-fire lockout assembly includes a blocking member coupled to the nosepiece assembly and a lockout member selectively engageable with the blocking member for moving the blocking member from a first position in which the workpiece contact element is configured to slide past the blocking member, and a second position in which the blocking member inhibits movement of the workpiece contact element when a predetermined number of fasteners remain in the magazine assembly. The lockout member is integral with the second portion of the pusher assembly. The pusher assembly is configured to transition from the first state to the second state after the predetermined number of fasteners remain in the magazine assembly. A biasing force of the first spring is configured to bias the pusher assembly into the first state.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
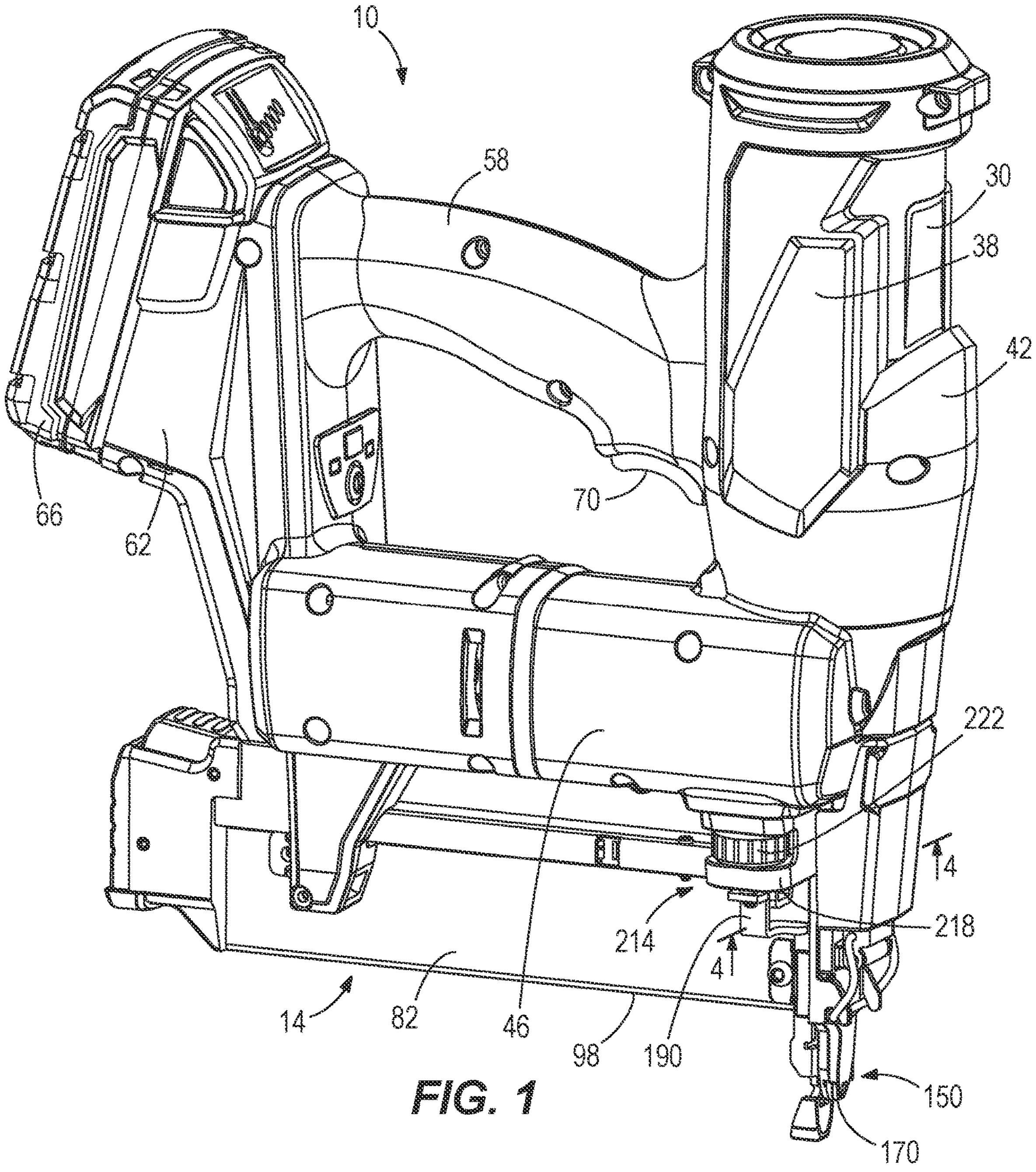
FIG. 1 is a perspective view of a powered fastener driver in accordance with an embodiment of the invention.
Figure 2:
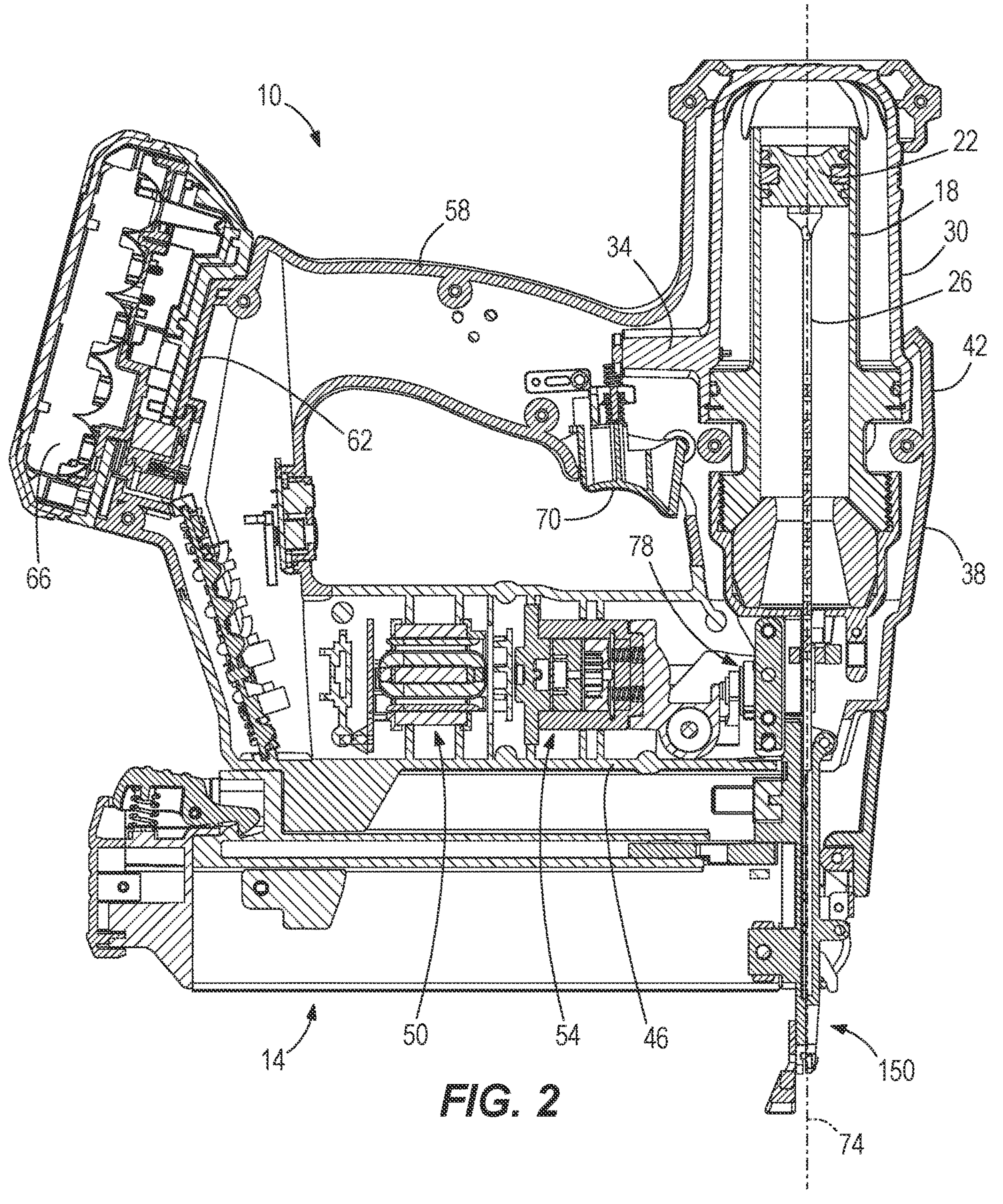
FIG. 2 is a cross-sectional view of the powered fastener driver of FIG. 1.
Figure 3:
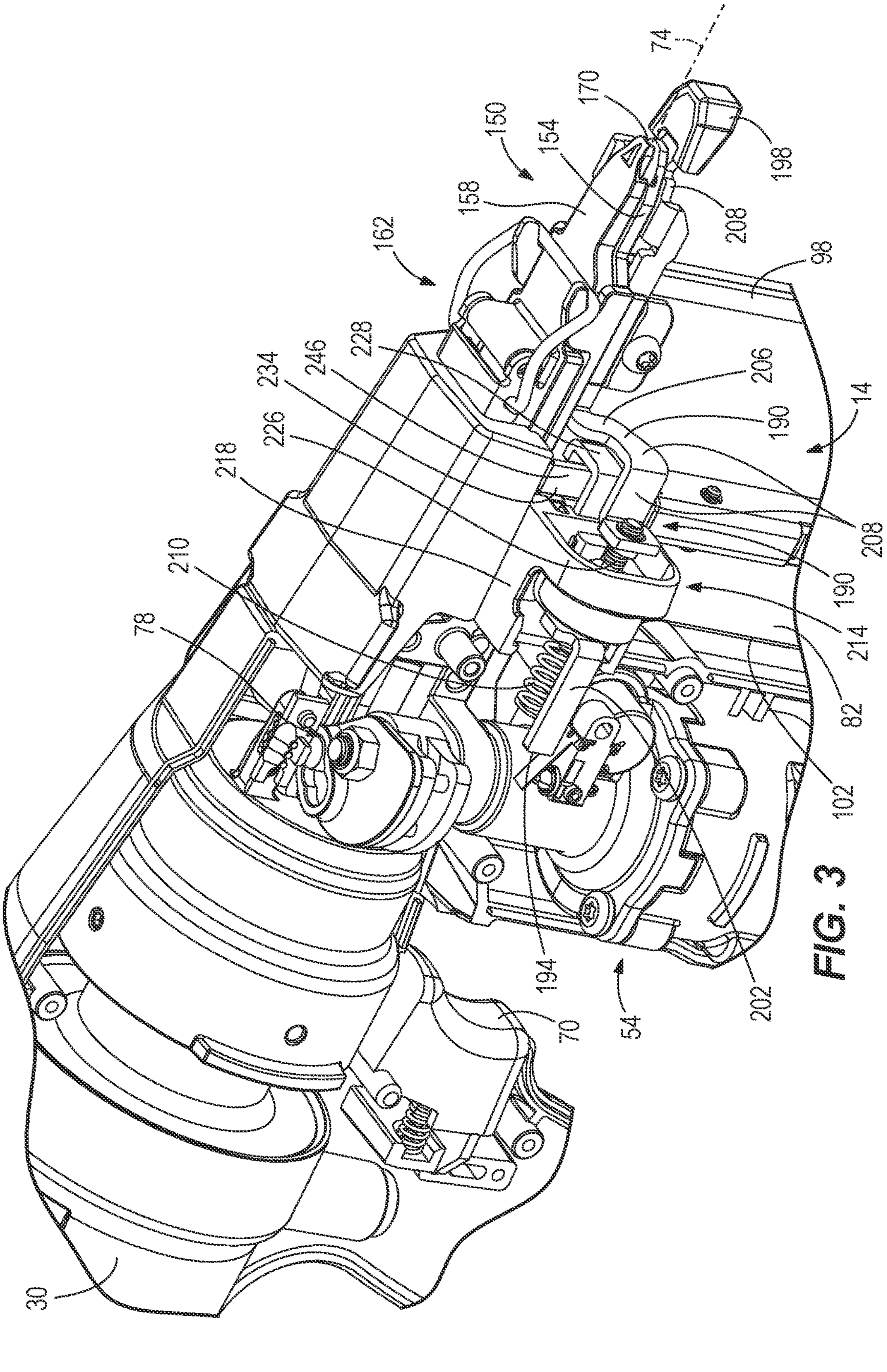
FIG. 3 is a partial cut-away view of the powered fastener driver of FIG. 1, with portions removed, illustrating a nosepiece assembly, a lifter assembly, and a depth of drive adjustment mechanism.

With reference to FIGS. 1-3, a powered fastener driver 10 is operable to drive fasteners (e.g., nails, tacks, staples, etc.) held within a magazine assembly 14 into a workpiece. The fastener driver 10 includes an inner cylinder 18 and a moveable piston 22 positioned within the cylinder 18 (FIG. 2). The fastener driver 10 further includes a driver blade 26 that is attached to the piston 22 and moveable therewith. The fastener driver 10 does not require an external source of air pressure, but rather includes an outer storage chamber cylinder 30 of pressurized gas in fluid communication with the inner cylinder 18. In the illustrated embodiment, the inner cylinder 18 and moveable piston 22 are positioned within the storage chamber cylinder 30. With reference to FIG. 2, the driver 10 further includes a fill valve 34 coupled to the storage chamber cylinder 30. When connected with a source of compressed gas, the fill valve 34 permits the storage chamber cylinder 30 to be refilled with compressed gas if any prior leakage has occurred. The fill valve 34 may be configured as a Schrader valve, for example.

With reference to FIG. 2, the fastener driver 10 includes a housing 38 having a cylinder housing portion 42 and a motor housing portion 46 extending therefrom. The cylinder housing portion 42 is configured to support the cylinders 18, 30, whereas the motor housing portion 46 is configured to support a motor 50 and a transmission 54 operatively coupled to the motor 50. The illustrated transmission 54 is configured as a planetary transmission having multiple planetary stages. In alternative embodiments, the transmission 54 may be a single-stage planetary transmission, or a multi-stage planetary transmission including any number of planetary stages.

The housing 38 further includes a handle portion 58 extending from the cylinder housing portion 42, and a battery attachment portion 62 coupled to an opposite end of the handle portion 58. A battery pack 66 is electrically connectable to the motor 50 for supplying electrical power to the motor 50. The handle portion 58 supports a trigger 70, which is depressed by a user to initiate a firing cycle of the fastener driver 10.

With reference to FIG. 2, the inner cylinder 18 and the driver blade 26 define a longitudinal axis 74. During a firing cycle, the driver blade 26 and piston 22 are moveable between a top-dead-center (TDC) position and a driven or bottom-dead-center (BDC) position. The fastener driver 10 further includes a lifting assembly 78 (FIG. 3), which is powered by the motor 50, and which is operable to move the driver blade 26 from the BDC position toward the TDC position.

In operation, the lifting assembly 78 drives the piston 22 and the driver blade 26 toward the TDC position by energizing the motor 50. As the piston 22 and the driver blade 26 are driven toward the TDC position, the gas above the piston 22 is compressed. Prior to reaching the TDC position, the motor 50 is deactivated and the piston 22 and the driver blade 26 are held in a ready position (FIG. 5A), which is located between the TDC and the BDC positions. Upon user depression of the trigger 70 (FIG. 1), the lifter assembly 78 continues lifting the driver blade 26 from the ready position to the TDC position, where the driver blade 26 is released from the lifter assembly 78. When released, the compressed gas above the piston 22 and within the storage chamber cylinder 30 drives the piston 22 and the driver blade 26 to the BDC position, thereby driving a fastener into the workpiece. The illustrated fastener driver 10 therefore operates on a gas spring principle utilizing the lifter assembly 78 and the piston 22 to compress the gas within the inner cylinder 18 and the storage chamber cylinder 30. Further detail regarding the structure and operation of the fastener driver 10 is provided below.

Figure 6:
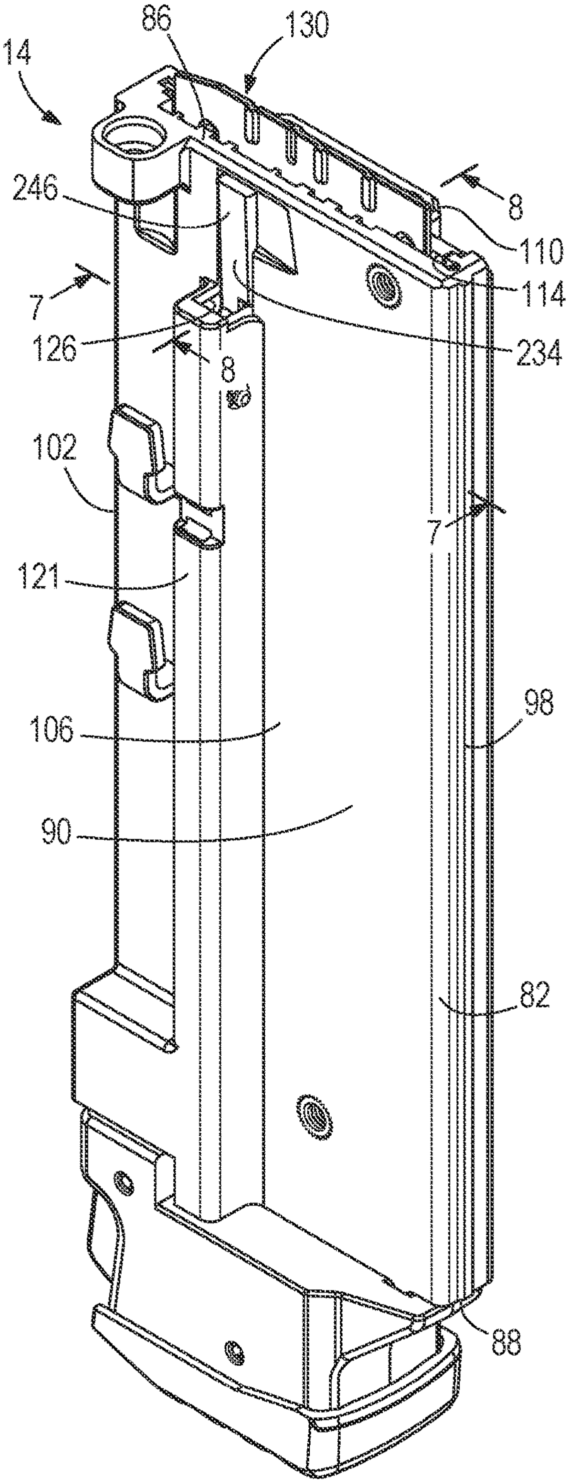
FIG. 6 is a perspective view of the magazine assembly of FIG. 1.
Figure 7:
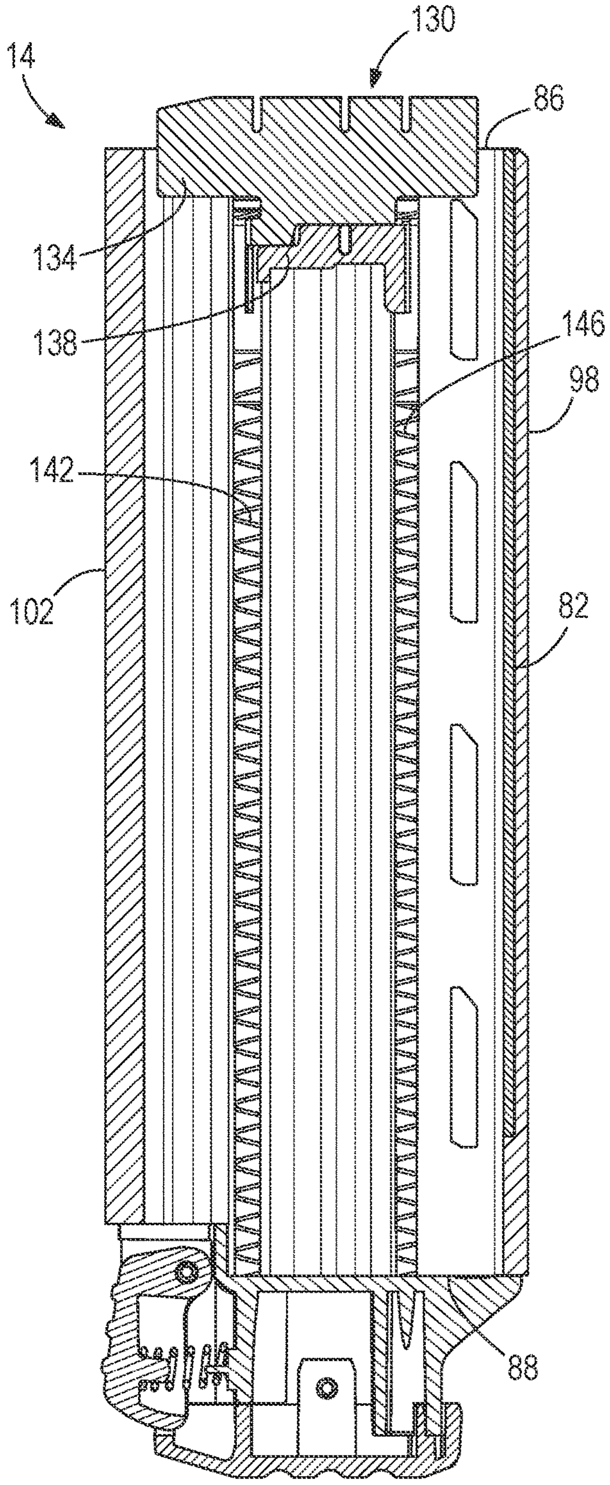
FIG. 7 is a cross-sectional view of the magazine assembly of FIG. 6 taken along line 7-7 in FIG. 6, illustrating a pusher assembly of the magazine assembly.
Figure 8:
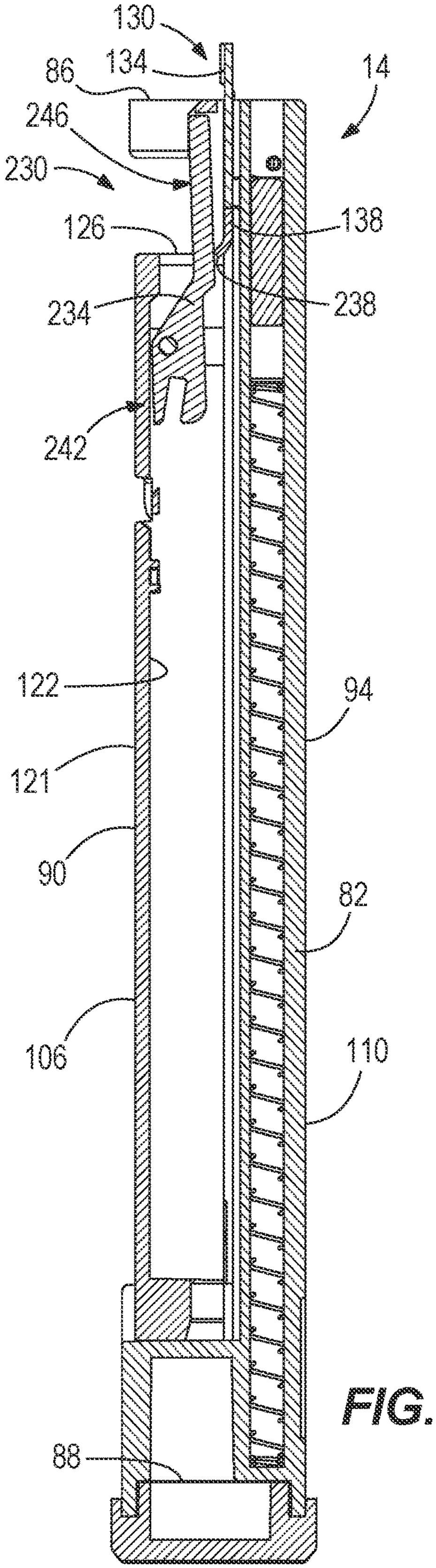
FIG. 8 is another cross-sectional view of the magazine assembly of FIG. 6 taken along line 8-8 in FIG. 6.

With reference to FIGS. 6-8, the magazine assembly 14 includes a magazine body 82 configured to receive the fasteners to be driven into the workpiece by the powered fastener driver. The magazine body 82 has a first end 86 and a second end 88 opposite the first end 86. The magazine body 82 further includes a first side 90 and a second side 94 (FIG. 8) opposite the first side 90, and a bottom side 98 and a top side 102 extending between the first and second sides 90, 94, respectively.

The illustrated magazine body 82 is formed by a base portion 106 and a cover portion 110. In particular, the cover portion 110 is slidably coupled to the base portion 106. Additionally, the base portion 106 and the cover portion 110 cooperatively define a fastener channel 114 (FIG. 6) extending from the first end 86 to proximate the second end 88 of the magazine body 82. The fastener channel 114 is configured to receive the fasteners (e.g., a collated fastener strip 120; shown schematically in FIG. 5B).

With particular reference to FIGS. 6 and 8, the first side 90 of the magazine body 82 includes a projection 121 defining a recess 122. The recess 122 extends along the first side 90 from proximate the second end 88 toward the first end 86. More specifically, the recess 122 extends parallel to and in connection with the fastener channel 114. The first side 90 further defines an opening or window 126 in connection with the recess 122 proximate the first end 86 of the magazine body 82.

Figure 9:
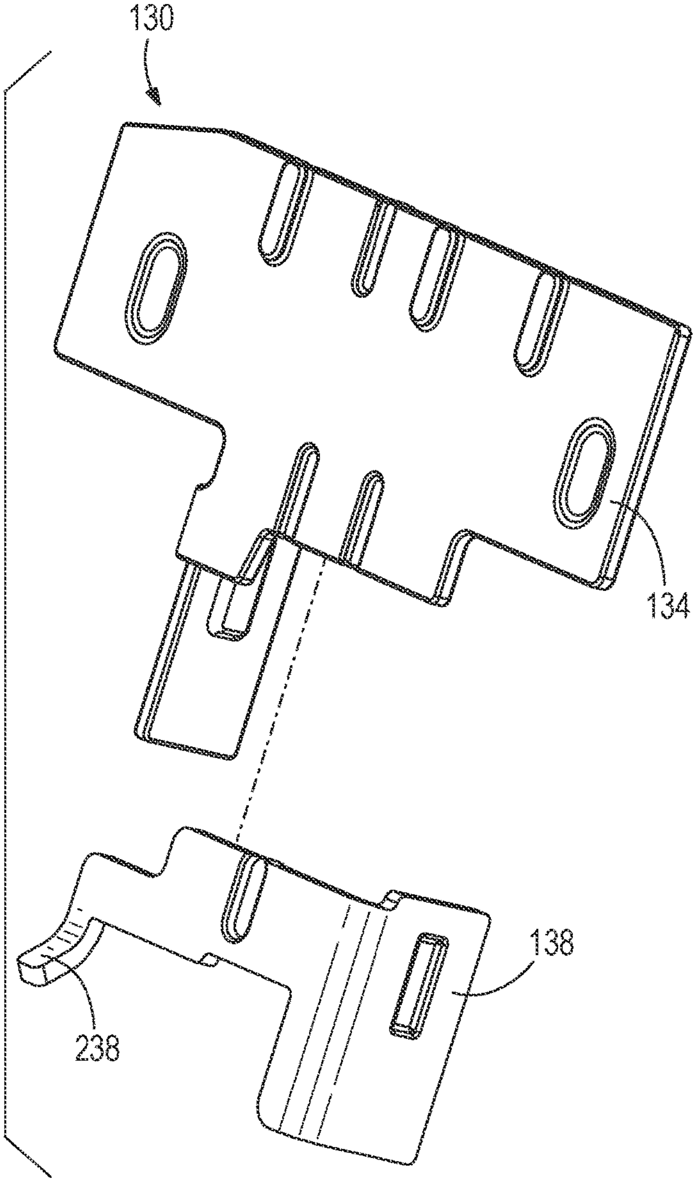
FIG. 9 is a perspective view of the pusher assembly of FIG. 7.
Figure 10:
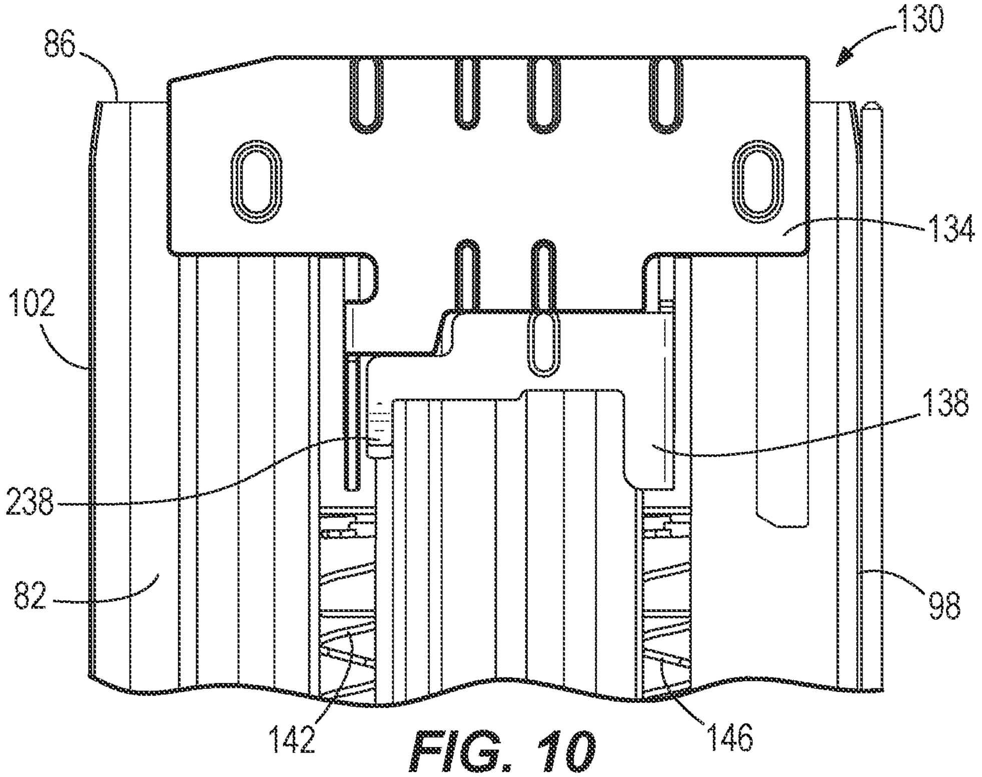
FIG. 10 is a partial cross-sectional view of the magazine assembly, illustrating the pusher assembly in a first state.
Figure 11:
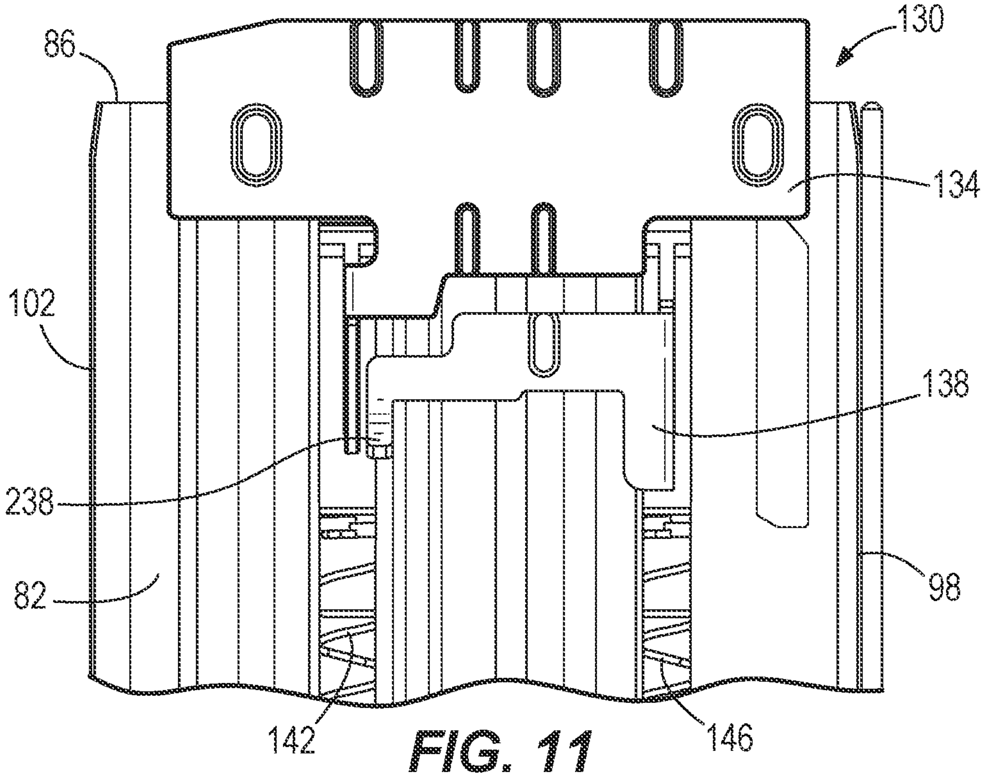
FIG. 11 is another partial cross-sectional view of the magazine assembly, illustrating the pusher assembly in a second state.

With reference to FIGS. 6-9, the magazine assembly 14 further includes a pusher assembly 130 positioned within the fastener channel 114 of the magazine body 82. The pusher assembly 130 is slidably coupled to the magazine body 82 and biases the collated fastener strip 120 toward the first end 86 of the magazine body 82. As shown in FIG. 9, the illustrated pusher assembly 130 includes a first portion 134 and a second portion 138 selectively coupled for movement with the first portion 134. The magazine assembly 14 includes a first spring 142 and a second spring 146 configured to bias the first portion 134 and the second portion 138, respectively, toward the first end 86 of the magazine body 82. More specifically, the first spring 142 exerts a biasing force on the first portion 134 for moving the first portion 134 toward the first end 86 of the magazine body 82, and the second spring 146 exerts a biasing force on the second portion 138 for moving the second portion 138 toward the first end 86, separate from the biasing force applied by the first spring 142. Because the first and second portions 134, 138 of the pusher assembly 130 are independently biased by the respective springs 142, 146 the pusher assembly 130 is movable in a first state, in which the first portion 134 and the second portion 138 move together in unison toward the first end 86 of the magazine body 82, and a second state in which the first portion 134 moves relative to the second portion 138, as further discussed below.

Figure 5A:
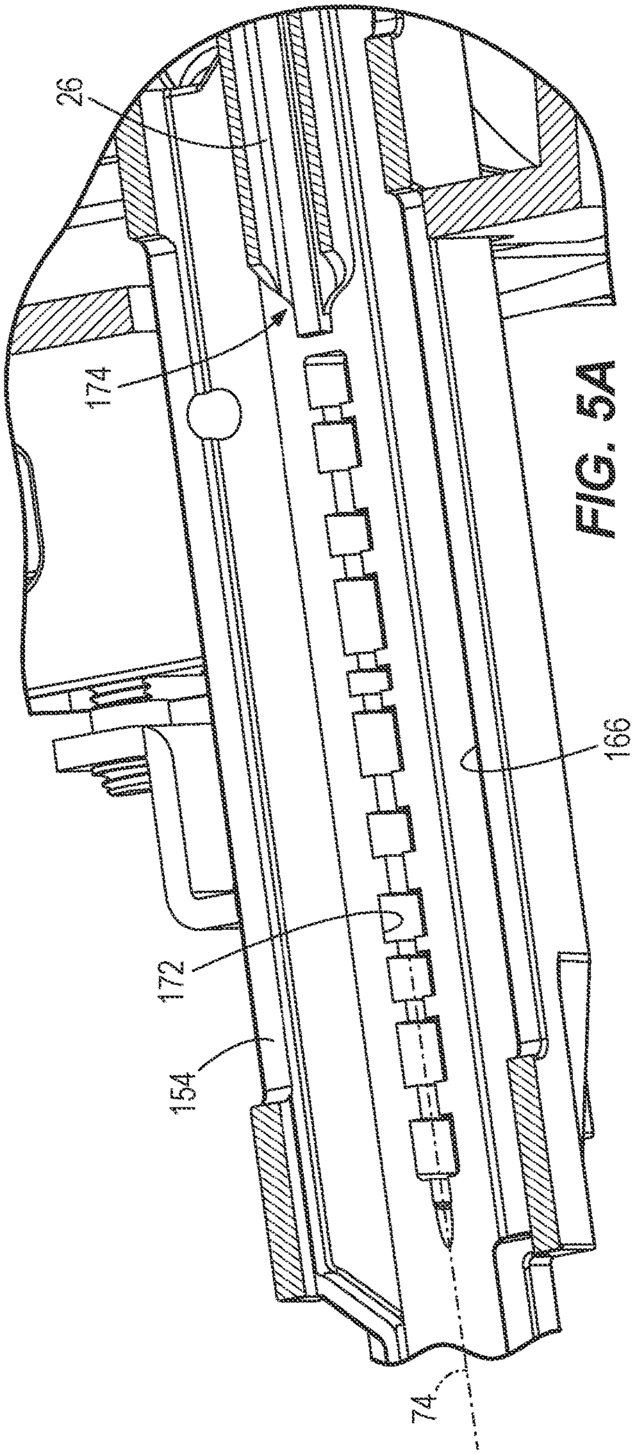
FIG. 5A is a partial cut-away view of the nosepiece assembly of FIG. 3.

With reference to FIG. 3, a nosepiece assembly 150 is positioned at the first end 86 of the magazine body 82. The nosepiece assembly 150 generally includes a first, base portion 154 coupled to the first end 86 of the magazine body 82 (FIG. 5A), and a second, cover portion 158 coupled to the base portion 154 (FIG. 3). The base portion 154 of the nosepiece assembly 150 is fixed to the base portion 106 of the magazine body 82. The cover portion 158 of the nosepiece assembly 150 substantially covers the base portion 154. In the illustrated embodiment, the cover portion 158 is pivotally coupled to the base portion 154 by a latch mechanism 162. The nosepiece assembly 150 cooperatively defines a firing channel 166 (only a portion of which is shown in FIG. 5A) extending along the longitudinal axis 74. The firing channel 166 is in communication with the fastener channel 114 of the magazine body 82 (e.g., by an opening 172 in the nosepiece base 154) for receiving a fastener from the magazine body 82. The nosepiece assembly 150 further has a distal end 170 at one end of the firing channel 166 (FIG. 3). The driver blade 26 is received in the firing channel 166 for driving the fastener from the firing channel 166, out the distal end 170 of the nosepiece assembly 150, and into a workpiece.

Figure 5B:
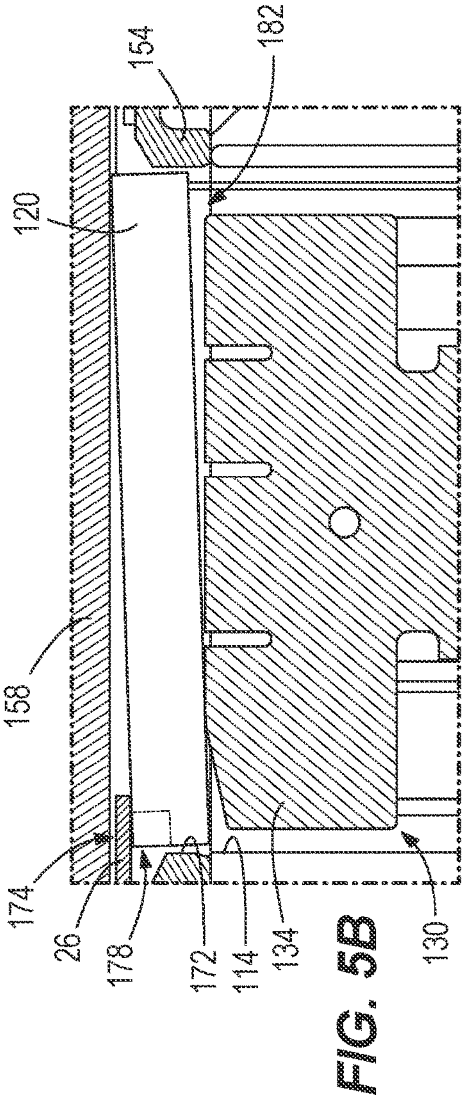
FIG. 5B is a partial cross-sectional view of a magazine assembly of the powered fastener driver of FIG. 1.

With reference to FIGS. 5A and 5B, when the driver blade 26 is in the ready position, a tip 174 of the driver blade 26 may partially cover (i.e., extend over) the fastener channel 114 and the opening 172. Fasteners strips 120 having select lengths (e.g., 2⅛ inches) may have a head portion 178 that is covered by the tip 174 of the driver blade 26 when the driver blade 26 is in the ready position such that an entire length of an individual fastener of the fastener strip 120 cannot enter the firing channel 166 until the driver blade 26 is moved to the TDC position during a firing cycle. Further, the first and second springs 142, 146 continue to bias the pusher assembly 130 (and the fastener strip 120) toward the firing channel 166, causing the fastener strip 120 to tip or pivot about the tip 174 of the driver blade 26, thereby creating a gap 182 (FIG. 5B) between the pusher assembly 130 and a last fastener of the fastener strip 120. When the driver blade 26 is moved from the ready position to the TDC position, the tip 174 of the driver blade 26 no longer covers the upper portion of the fastener channel 114 coinciding with the head portion 178 of the fastener strip 120, permitting the entire length of an individual fastener to be received in the firing channel 166. This allows the overall height of the driver 10 to be reduced, while still permitting fasteners having a relatively long length (e.g., 2⅛ inches or greater) to be used with the driver 10.

With reference to FIGS. 1-3, the driver 10 includes a workpiece contact element 190 extending along one side of the nosepiece assembly 150. The workpiece contact element 190 includes a first end 194 (FIG. 3) and a second, opposite end 198 that is engageable with a workpiece during a firing operation. The workpiece contact element 190 includes a plurality of sections 202, 206 in which each section 202, 206 is formed by a plurality of interconnected segments 208. A spring 210 (FIG. 3) is configured to bias the workpiece contact element 190 toward an extended position. The workpiece contact element 190 is configured to be moved from the extended position toward a retracted position when the workpiece contact element 190 is pressed against a workpiece.

The illustrated workpiece contact element 190 includes generally two sections 202, 206, each section 202, 206 formed by multiple segments 208, and in which adjacent segments 208 are coupled by a bend. A first section 202 of the workpiece contact element 190 is positioned closer to the top side 102 of the magazine body 82 rather than the bottom side 98. The first section 202 includes the first end 194 of the workpiece contact element 190. The second section 206 includes at least a segment 208 that is positioned directly rearward of the base portion 154 of the nosepiece assembly 150, and extends along the longitudinal axis 74. The second section 206 includes the second end 198 that is configured to engage a workpiece. The first and second sections 202, 206 are coupled together by a depth of drive adjustment mechanism 214, which adjusts the effective length of the workpiece contact element 190.

With reference to FIGS. 1 and 3, the depth of drive adjustment assembly 214 includes a support member 218, an adjustment knob 222 (FIG. 1), and a screw portion 226. The adjustment knob 222 is rotatably supported upon the support member 218. The screw portion 226 extends between the first section 202 and the second section 206 of the workpiece contact element 190. One end of the second section 206 is threadably coupled to the screw portion 226. Furthermore, the screw portion 226 is coupled for co-rotation with the adjustment knob 222. Accordingly, the screw portion 226 and the knob 222 are rotatably supported by the support member 218. Rotation of the adjustment knob 222 axially threads the second section 206 along the screw portion 226 for adjusting a protruding length of the workpiece contact element 190 relative to the distal end 170 of the nosepiece assembly 150. More specifically, rotation of the adjustment knob 222 moves the second section 206 relative to the first section 202 for adjusting an effective length of the workpiece contact element 190. As such, the adjustment knob 222 may be termed as an actuator.

The depth of drive adjustment assembly 214 adjusts the depth to which a fastener is driven into the workpiece. In particular, the depth of drive adjustment assembly 214 adjusts the length that the workpiece contact element 190 protrudes relative to the distal end 170 of the nosepiece assembly 150, thereby changing the distance between the distal end 170 of the nosepiece assembly 150 and the workpiece contact element 190 in the extended position. In other words, the depth of drive adjustment assembly 214 adjusts how far the workpiece contact element 190 extends past the nosepiece assembly 150 for abutting with a workpiece. The larger the gap between the distal end 170 of the nosepiece assembly 150 and the workpiece, the shallower the depth a fastener will be driven into the workpiece. As such, the position of the workpiece contact element 190 with respect to the nosepiece assembly 150 is adjustable to adjust the depth to which a fastener is driven.

The workpiece contact element 190 further includes an engagement portion 228. In the illustrated embodiment, the first section 202 includes the engagement portion 228. In addition, the engagement portion 228 is positioned between the depth of drive adjustment mechanism 214 and the nosepiece assembly 150. The engagement portion 228 is intermediate the first and second ends 194, 198 of the workpiece contact element 190.

With reference to FIGS. 3 and 8, the powered fastener driver 10 further includes a dry-fire lockout assembly 230 (FIG. 8). The dry-fire lockout assembly 230 includes the engagement portion 228 of the workpiece contact element 190, a blocking member 234, and a lockout member 238 engageable with the blocking member 234 (FIG. 9). The blocking member 234 is received in the recess 122 of the magazine body 82. The blocking member 234 includes a first end portion 242 pivotally coupled to the first side 90 of the magazine body 82. A second end portion 246 of the blocking member 234 opposite the first end portion 242 is selectively received in the window 126 defined by the first side 90 of the magazine body 82. The illustrated blocking member 234 is configured as a pivotable lever.

Figure 4:
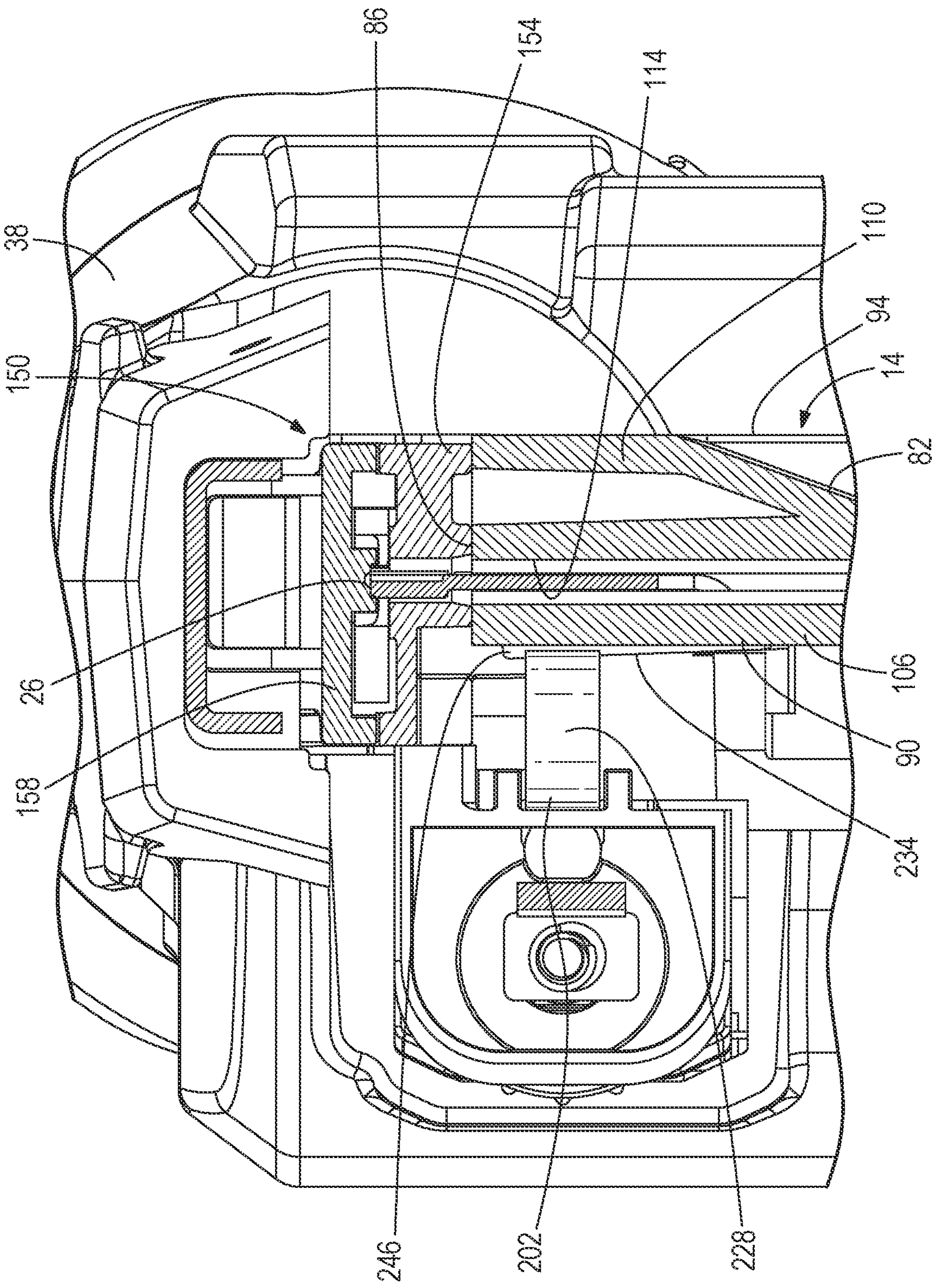
FIG. 4 is a cross-sectional view of the powered fastener driver of FIG. 1 taken along line 4-4 in FIG. 1.

With reference to FIGS. 4 and 8, the blocking member 234 is movable (e.g., pivotable) between a first, non-blocking or bypass position, and a second, blocking position. A spring (not shown) is configured to bias the blocking member 234 toward the bypass position. When the blocking member 234 is in the blocking position, the second end portion 246 of the blocking member 234 protrudes into the window 126 where it interferes with retraction of the workpiece contact element 190, which is a prerequisite for initiating a fastener firing cycle. More specifically, the second end portion 246 extends into a path of the engagement portion 228 in order to prevent movement of the workpiece contact element 190 into the page from the frame of reference of FIG. 4. In some embodiments, the movement of the workpiece contact element 190 along the longitudinal axis 74 is stopped completely by the second end portion 246 of the blocking member 234 when the blocking member 234 is moved toward the second position.

The lockout member 238 is integral with the second portion 138 of the pusher assembly 130 (FIGS. 8 and 9). The illustrated lockout member 238 is a tang or projection extending at an angle from the second portion 138 of the pusher assembly 130. The lockout member 238 is selectively engageable with the second end portion 246 of the blocking member 234 for moving the blocking member 234 from the first position toward the second position against the bias of the spring. More specifically, the lockout member 238 is configured to move the blocking member 234 toward the second position where the blocking member 234 is configured to block movement of the workpiece contact element 190 when a predetermined number of fasteners (e.g., 0, 1, 2, etc.) remain in the magazine assembly 14. The predetermined number of fasteners remaining may be five or less. For example, in some embodiments, the predetermined number of fasteners may be 1, 2, 3, etc. In other embodiments, the predetermined number of fasteners may be zero. In the illustrated embodiment, the predetermined number of fasteners is four.

In operation, with more than the predetermined number of fasteners in the magazine assembly 14, the first and second portions 134, 138 of the pusher assembly 130 move in unison, biased by the respective springs 142, 146, toward the first end 86 of the magazine body 82 in an incremental manner as consecutive fasteners from the collated fastener strip 120 are moved into the firing channel 166 and discharged from the nosepiece assembly 150. At this time, the blocking member 234 remains in a bypass position within the recesses 122, which allows for the workpiece contact element 190 to retract in response to being depressed against a workpiece to enable actuation of the fastener driver 10.

In a scenario in which fasteners having a relatively short length (e.g., 2 inches or less) are placed in the magazine assembly 14, when the predetermined number of fasteners remaining in the magazine assembly 14 is reached, the lockout member 238 engages the second end portion 246 and pivots the blocking member 234 from the bypass position toward the blocking position against the bias of the spring. Upon reaching the blocking position, the second end portion 246 of the blocking member 234 protrudes into the window 126, and retraction of the workpiece contact element 190 is inhibited (i.e., by engagement between the second end portion 246 and the engagement portion 228 of the workpiece contact element 190) in order to prevent further activation of the powered fastener driver 10. In this scenario, movement of the pusher assembly 130 may remain in the first state (i.e., with the first and second portions 134, 138 moving together in unison) up until the blocking member 234 is moved to the blocking position.

However, in a scenario in which fasteners having a relatively long length (e.g., 2⅛ inches) are placed in the magazine assembly 14, when the predetermined number of fasteners remaining in the magazine assembly 14 is reached, the skewed collated fastener strip 120 within the channel 114 may only permit the lockout member 238 to partially move the blocking member 234 toward the blocking position. That is, the blocking member 234 may be moved to an intermediate position between the bypass position and the blocking position, in which the second end portion 146 only slightly protrudes into the window 126. With the blocking member 234 in the intermediate position, it's possible for the workpiece contact element 190 to nominally engage the second end portion 146 during retraction and pivot the blocking member 234 back toward the bypass position, permitting continued retraction of the workpiece contact element 190 to enable a fastener firing cycle. In this scenario, movement of the pusher assembly 130 transitions from the first state to the second state (i.e., with the first portion 134 moving relative to the second portion 138) after the blocking member 234 is moved to the intermediate position.

Because the first portion 134 of the pusher assembly 130 is separable from the second portion 138 and independently biased toward the first end 86 of the magazine body 82 by the spring 142, the first portion 134 of the pusher assembly 130 may continue to move toward the first end 86 of the magazine body 82 even if the second portion 138 is stopped due to engagement between the lockout member 238 and the blocking member 234. Therefore, the first portion 134 of the pusher assembly 130 can push an individual fastener in the collated fastener strip 120 into the firing channel 166, despite the blocking member 234 being in an intermediate position between the bypass and blocking positions, preventing a "dry-fire" cycle in which the driver blade 26 is driven from the TDC position to the BDC position without a fastener in the firing channel 166.

After one or two like firing cycles after the predetermined number of fasteners has been reached, the second portion 138 of the pusher assembly 130 is permitted to move far enough toward the first end 86 of the magazine body 82 to fully pivot the blocking member 234 to the blocking position, thereby inhibiting retraction of the workpiece contact element 150 and preventing further fastener firing cycles.

FIGS. 12-19 illustrate a second embodiment of a powered fastener driver 1010, according to another embodiment of the invention, with like components and features as the first embodiment of the powered fastener driver 10 shown in FIGS. 1-11 being labeled with like reference numerals plus "1000". The powered fastener driver 1010 is similar to the powered fastener driver 10 and, accordingly, the discussion of the powered fastener driver 10 above similarly applies to the powered fastener driver 1010 and is not re-stated. Rather, only differences between the powered fastener driver 10 and the powered fastener driver 1010 are specifically noted herein, such as differences in the pusher assembly and the dry-fire lockout assembly.

Figure 12:
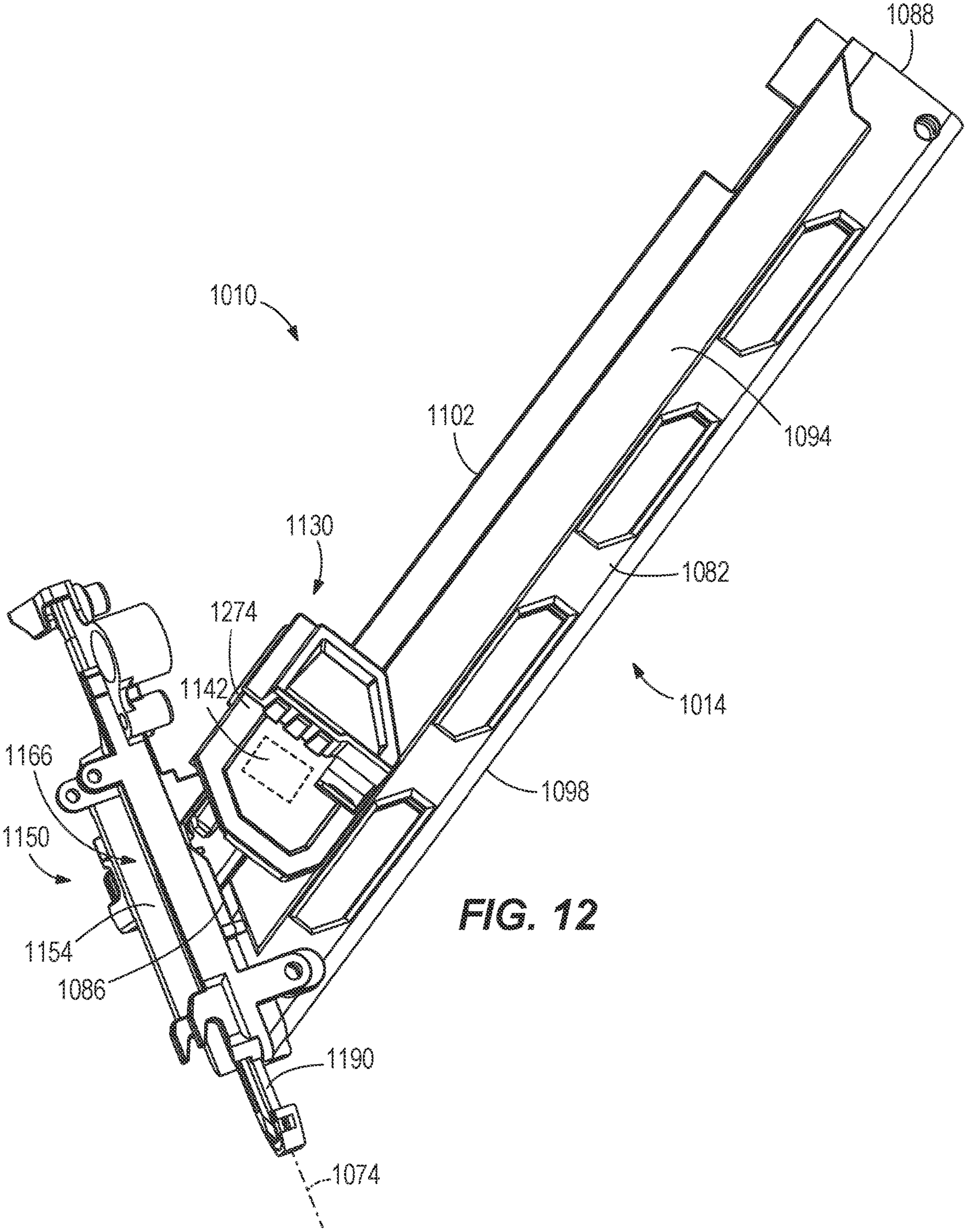
FIG. 12 is a side perspective view of a portion of a powered fastener driver in accordance with another embodiment of the invention.
Figure 13:
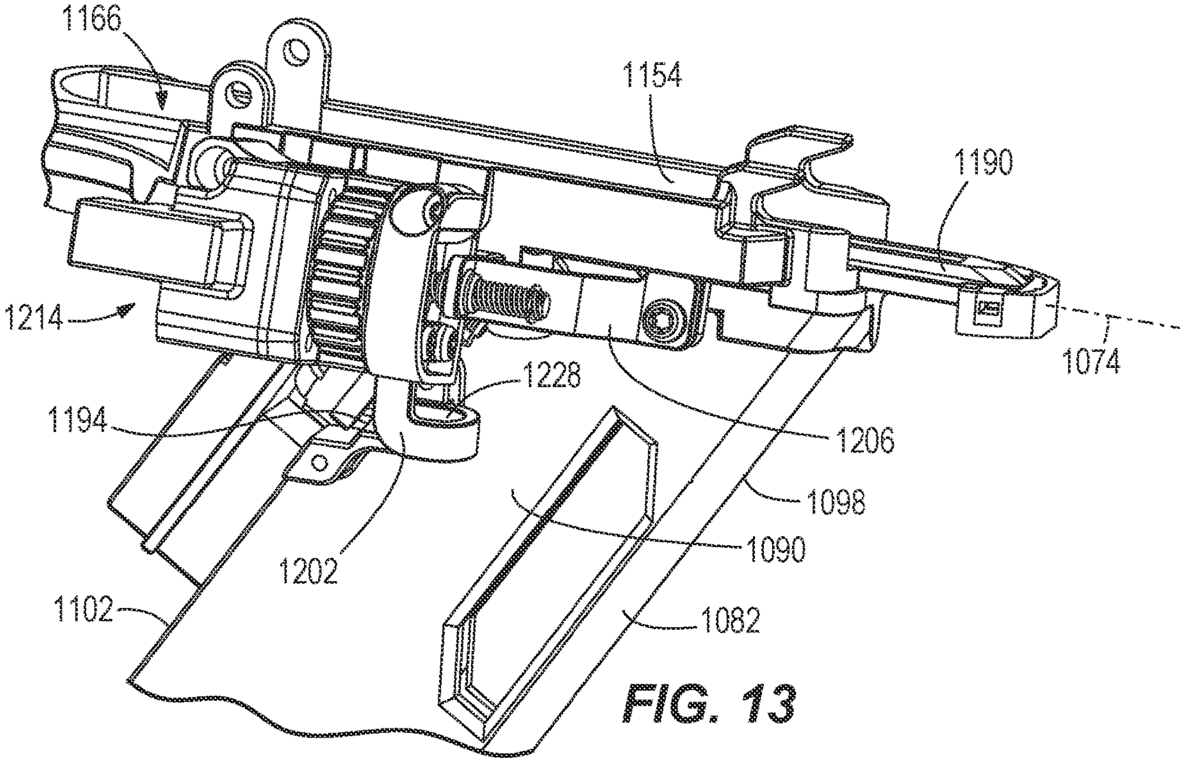
FIG. 13 is a partial cut-away view of the portion of the powered fastener driver of FIG. 12, illustrating a depth of drive adjustment mechanism positioned relative to a portion of a nosepiece assembly and a magazine assembly of the powered fastener driver of FIG. 12.
Figure 14:
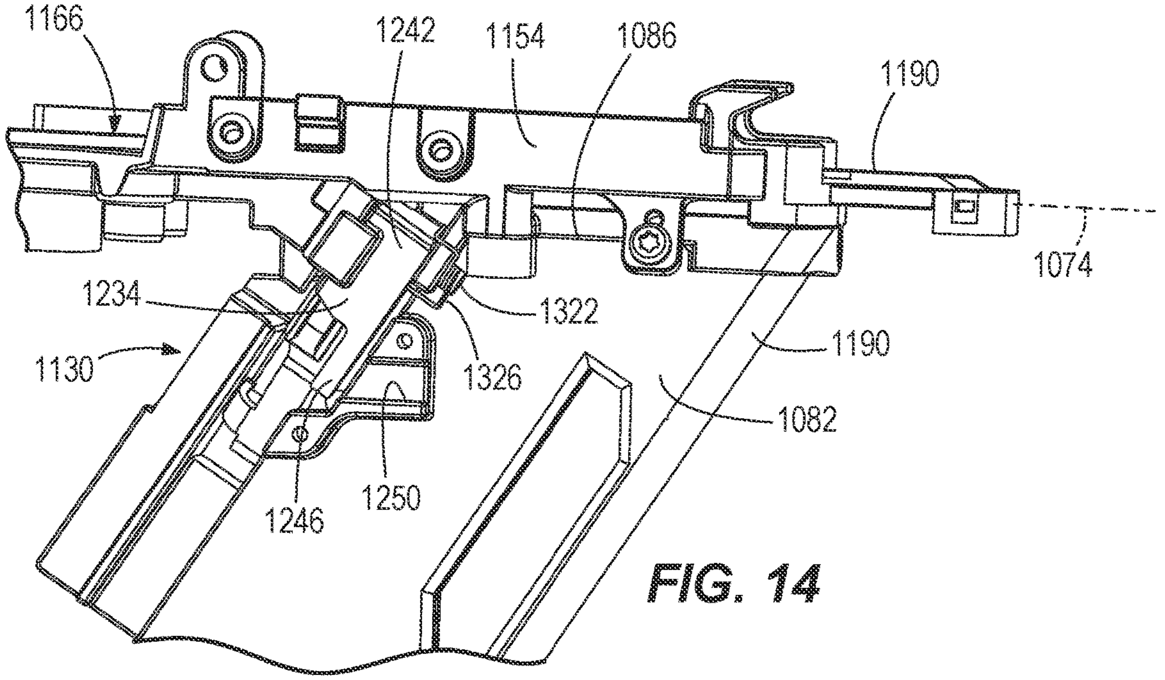
FIG. 14 is another partial cut-away view of the portion of the powered fastener driver of FIG. 13, illustrating a groove defined by the magazine assembly of FIG. 13.
Figure 18:
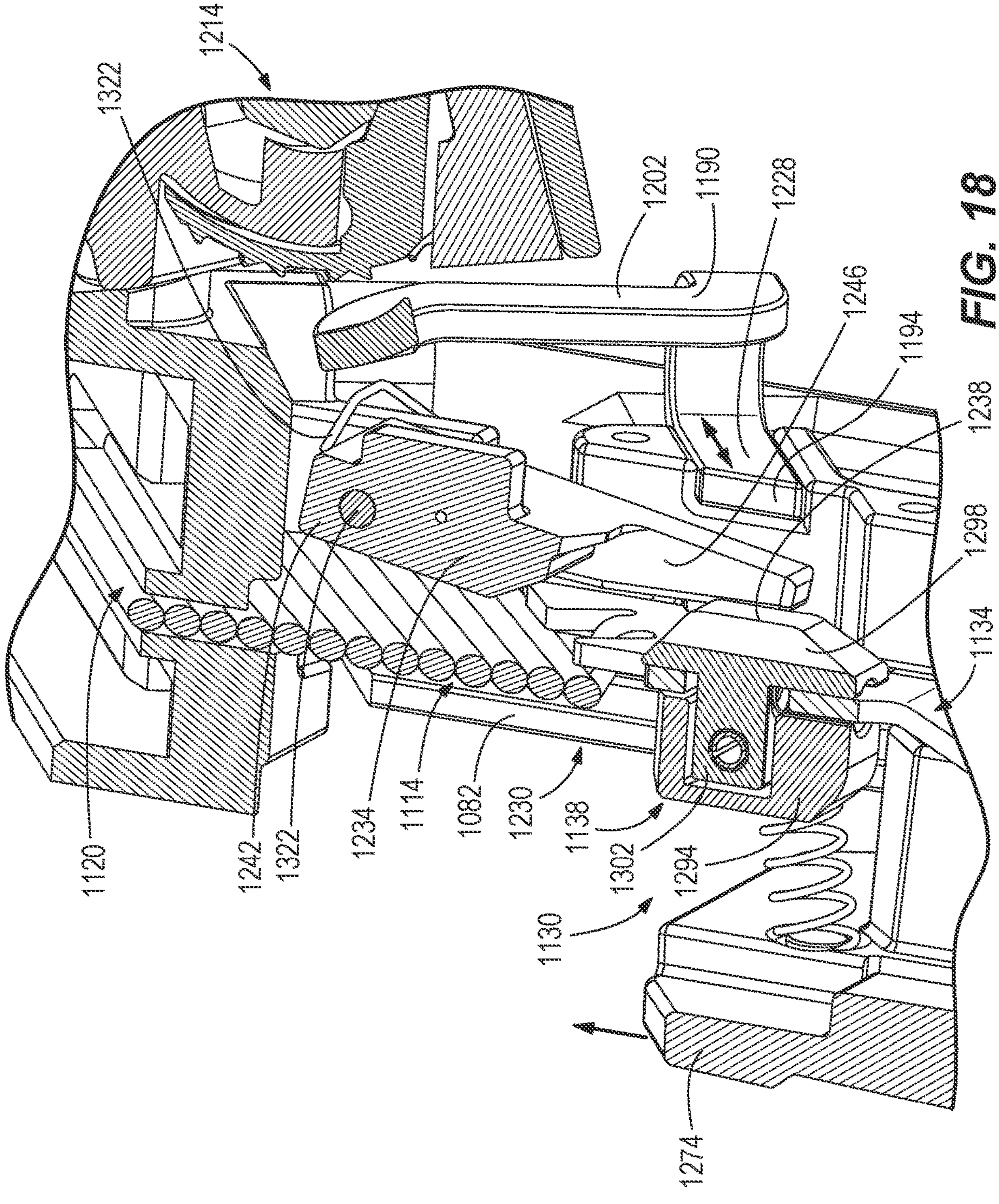
FIG. 18 is a partial cut-away perspective view of the magazine assembly, illustrating a dry-fire lockout assembly having a blocking member in a bypass position.

With reference to FIGS. 12-14, the powered fastener driver 1010 includes a magazine assembly 1014 having a magazine body 1082, and a nosepiece assembly 1150. The magazine body 1082 has a first end 1086 and a second end 1088 opposite the first end 1086. The magazine body 1082 further includes a first side 1090 (FIG. 13) and a second side 1094 (FIG. 12) opposite the first side 1090, and a bottom side 1098 and a top side 1102 extending between the first and second sides 1090, 1094, respectively. The magazine body 1082 defines a fastener channel 1114 (FIG. 18) extending from the first end 1086 to proximate the second end 1088. The fastener channel 1114 is configured to receive the fasteners (e.g., a collated fastener strip 1120; FIG. 18).

With reference to FIGS. 12-14, the nosepiece assembly 1150 includes a base portion 1154 and a cover portion (not shown) coupled to the base portion 1154. The base portion 1154 is coupled to the first end 1086 of the magazine body 1082. The nosepiece assembly 1150 cooperatively defines a firing channel 1166 (only a portion of which is shown in FIGS. 12-14) extending along a longitudinal axis 1074. The firing channel 1166 is in communication with the fastener channel 1114 of the magazine body 1082.

The driver 1010 further includes a workpiece contact element 1190 slidably coupled to the base portion 1154. The illustrated workpiece contact element 1190 includes generally two sections 1202, 1206 (FIG. 13). The first and second sections 1202, 1206 are coupled together by a depth of drive adjustment mechanism 1214, which adjusts the effective length of the workpiece contact element 1190. A spring (not shown) is configured to bias the workpiece contact element 1190 toward an extended position. The workpiece contact element 1190 is configured to be moved from the extended position toward a retracted position when the workpiece contact element 1190 is pressed against a workpiece With reference to FIGS. 13-14, the first side 1090 of the magazine body 1082 includes a groove 1250. The first section 1202 of the workpiece contact element 1190 is at least partially received in groove 1250 (FIG. 14). More specifically, in the illustrated embodiment, the first section 1202 of the workpiece contact element 1190 includes an elongated end portion 1228 (FIG. 13) that is received in the groove 1250. The end portion 1228 of the first section 1202 is slidable within the groove 1250. As such, the groove 1250 is configured to guide movement of the first section 1202, and therefore the workpiece contact element 1190, relative to the nosepiece assembly 1150/magazine assembly 1014. The end portion 1228 is also an engagement portion of the workpiece contact element 1190. The end portion 1228 is positioned to one side (i.e., below from the frame of reference of FIG. 13) of the depth of drive adjustment mechanism 1214 and the nosepiece assembly 1150. In addition, the end portion 1228 forms one end 1194 of the workpiece contact element 1190. A portion of the illustrated second section 1206 of the workpiece contact element 1190 is at least partially positioned within the nosepiece assembly 1150 and extends along the longitudinal axis 1074. As such, at least the portion of the second section 1206 partially defines the firing channel 1166.

Figure 15:
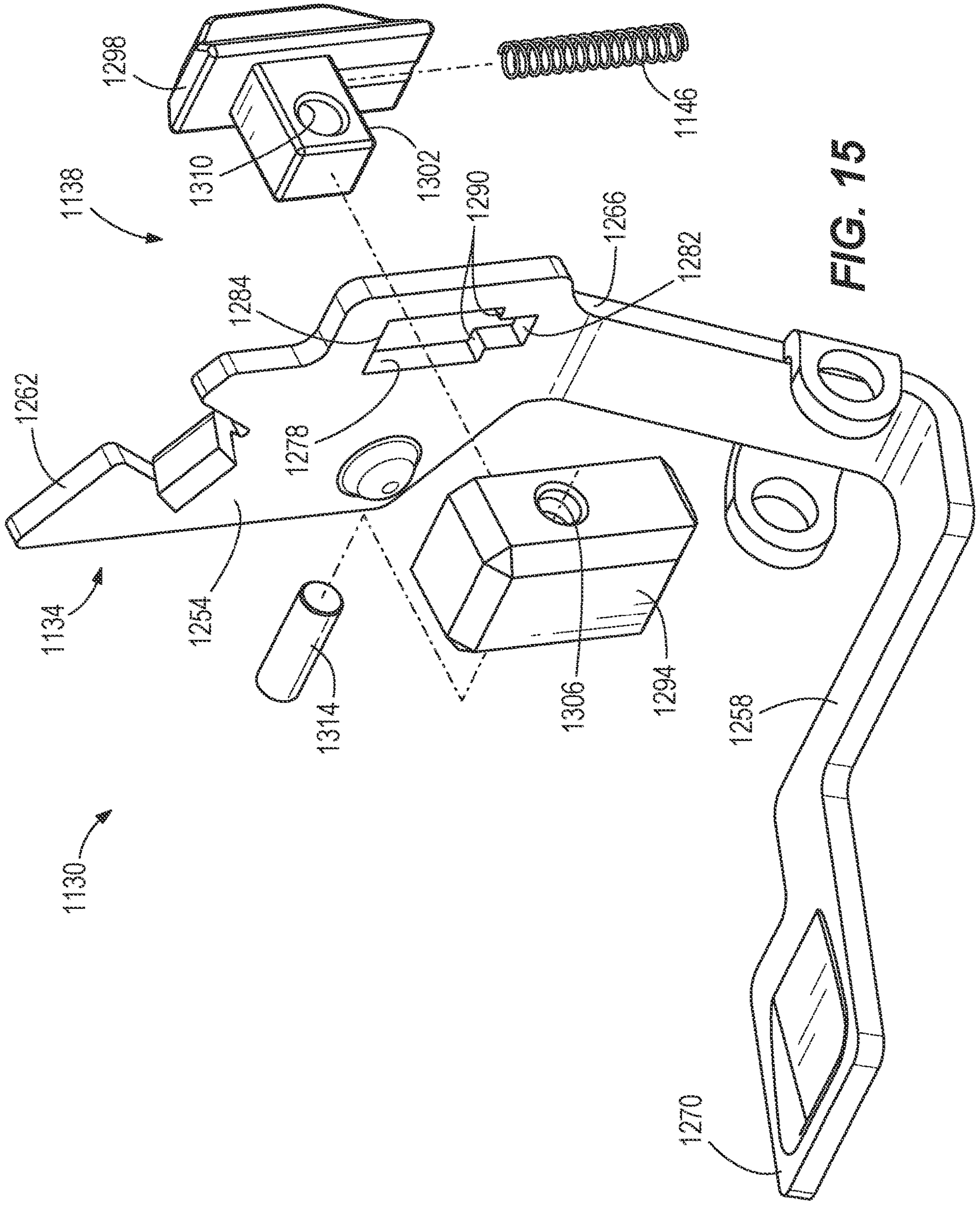
FIG. 15 is an exploded view of a pusher assembly of the portion of the powered fastener driver of FIG. 12.
Figure 16:
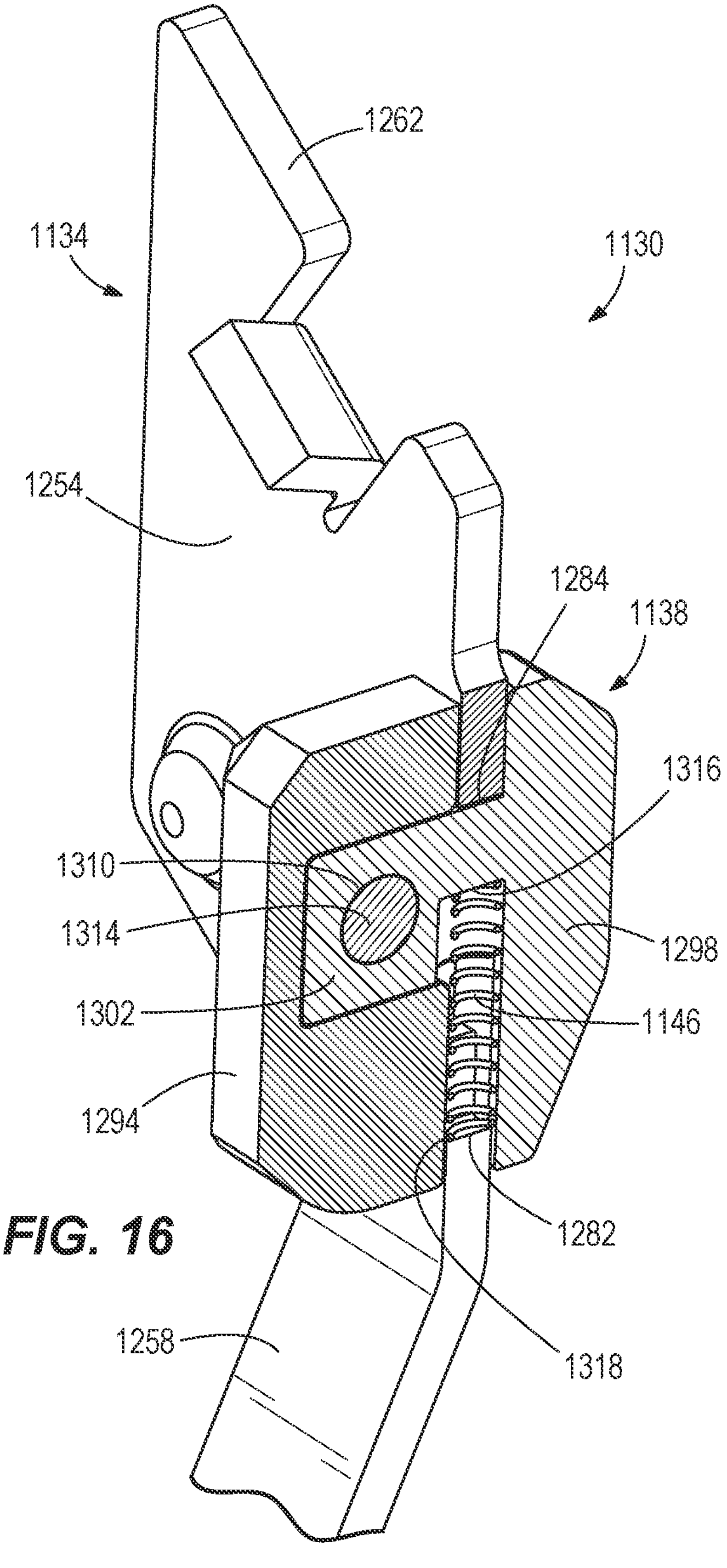
FIG. 16 is a partial cut-away perspective view of the pusher assembly of FIG. 15.

With reference to FIGS. 12 and 15-19, the driver 1010 includes a pusher assembly 1130 slidably coupled to the magazine body 1082. As shown in FIG. 16, the illustrated pusher assembly 1130 includes a first portion 1134 and a second portion 1138 movably coupled to the first portion 1134. The magazine assembly 1014 includes a first spring 1142 (FIG. 12) configured to exert a biasing force on the pusher assembly 1130 for moving the pusher assembly 1130 toward the first end 1086 of the magazine body 1082. Furthermore, the second portion 1138 is movably coupled to the first portion 1134 by a second spring 1146. As such, the first portion 1134 of the pusher assembly 1130 may selectively move relative to the second portion 1138. The biasing force of the second spring 1146 is independent of the biasing force of the first spring 1142. The pusher assembly 1130 is movable in a first state, in which the first portion 1134 and the second portion 1138 move together in unison toward the first end 1086 of the magazine body 1082, and a second state in which the first portion 1134 moves relative to the second portion 1138, as further discussed below.

Figure 17:
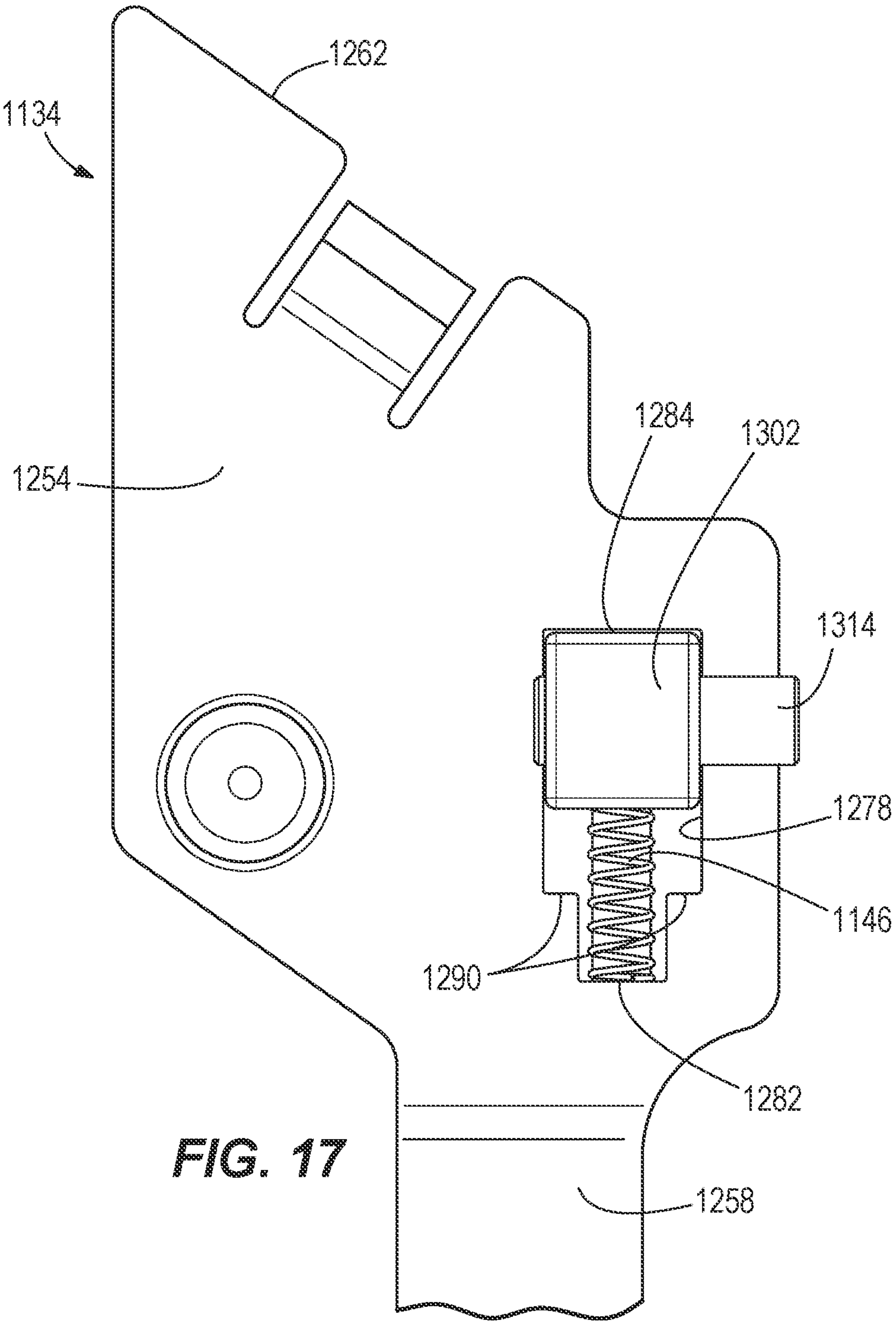
FIG. 17 is a partial cut-away side view of the pusher assembly of FIG. 15.

In the illustrated embodiment of the pusher assembly 1130, with reference to FIGS. 15-17, the first portion 1134 of the pusher assembly 1130 includes a body 1254 and an arm member 1258 extending therefrom. An edge 1262 of the body 1254 is configured to engage the fasteners within the fastener channel 1114 of the magazine body 1082. A first end 1266 (FIG. 15) of the arm member 1258 is coupled to the body 1254. And a second end 1270 opposite the first end 1266 is coupled to a handle portion 1274 (FIG. 12) of the pusher assembly 1130. The handle portion 1274 is engageable by a user for moving the pusher assembly 1130 from the first end 1086 toward the second end 1088 of the magazine body 1082. The body 1254 of the first portion 1134 further defines a cut-out or window 1278 (FIG. 15). The window 1278 is defined by a plurality of walls 1282, 1284 and a stopping member 1290. The stopping member 1290 is positioned intermediate a lower wall 1282 and an upper wall 1284 of the plurality of walls 1282, 2184 of the window 1278.

The illustrated second portion 1138 of the pusher assembly 1130 is at least partially received in the window 1278.

More specifically, the second portion 1138 includes a first housing member 1294 and a second housing member 1298. The second housing member 1298 includes a tab or protruding portion 1302 extending therefrom. The first housing member 1294 is positioned on one side of the window 1278, and the second housing member 1298 is positioned on an opposite side. The protruding portion 1302 extends from the second housing member 1298 through the window 1278 to the first housing member 1294. Furthermore, the first housing member 1294 includes a hole 1306, and the protruding portion 1302 includes another hole 1310 aligned with the hole 1306 of the first housing member 1294. A pin 1314 extends through the holes 1306, 1310 for coupling the first and second housing members 1294, 1298, respectively, together. The pin 1314 is positioned on the side of the window 1278 where the first housing member 1294 is located (FIG. 16). In other embodiments, the second portion 1138 of the pusher assembly 1130 may be formed by one or more pieces.

A first end 1316 of the second spring 1146 is seated against an interior surface of the protruding portion 1302 of the second housing member 1298. A second, opposite end 1318 of the spring 1146 is seated against the lower wall 1282 of the window 1278 of the first portion 1134. As such, the second spring 1146 extends between the upper and lower walls 1282, 1286, respectively, of the window 1278. In particular, the first and second housing members 1294, 1298 collectively define a cavity to house the second spring 1146 therewithin. Furthermore, the second spring 1146 is fixed between the first portion 1134 and the second portion 1138 of the pusher assembly 1130. The second spring 1146 is configured to bias the second portion 1138 of the pusher assembly 1130 toward the upper wall 1286 of the window 1278 of the first portion 1134. The stopping member 1290 is configured to limit movement of the first portion 134 relative to the second portion 1138 from proximate the upper wall 1286 toward the lower wall 1282.

With reference to FIGS. 13-14 and 18-19, the powered fastener driver 10 further includes a dry-fire lockout assembly 1230. The dry-fire lockout assembly 1230 includes the engagement portion 1228 (i.e., end portion) of the workpiece contact element 1190, a blocking member 1234, and a lockout member 1238 engageable with the blocking member 1234. The blocking member 1234 is pivotably coupled to the base portion 1154 of the nosepiece assembly 1150 proximate the first end 1086 of the magazine body 1082 (FIG. 14). The blocking member 1234 includes a first end portion 1242 pivotally coupled to the base portion 1154 by a pin 1322, and a second end portion 1246 of the blocking member 1234 opposite the first end portion 1242. The second end portion 1246 is positioned proximate the groove 1250 in the magazine body 1082 such that the second end portion 1246 may selectively block the end 1194 of the workpiece contact element 1190 (i.e., the first section 1202). The illustrated blocking member 1234 is configured as a pivotable lever.

Figure 19:
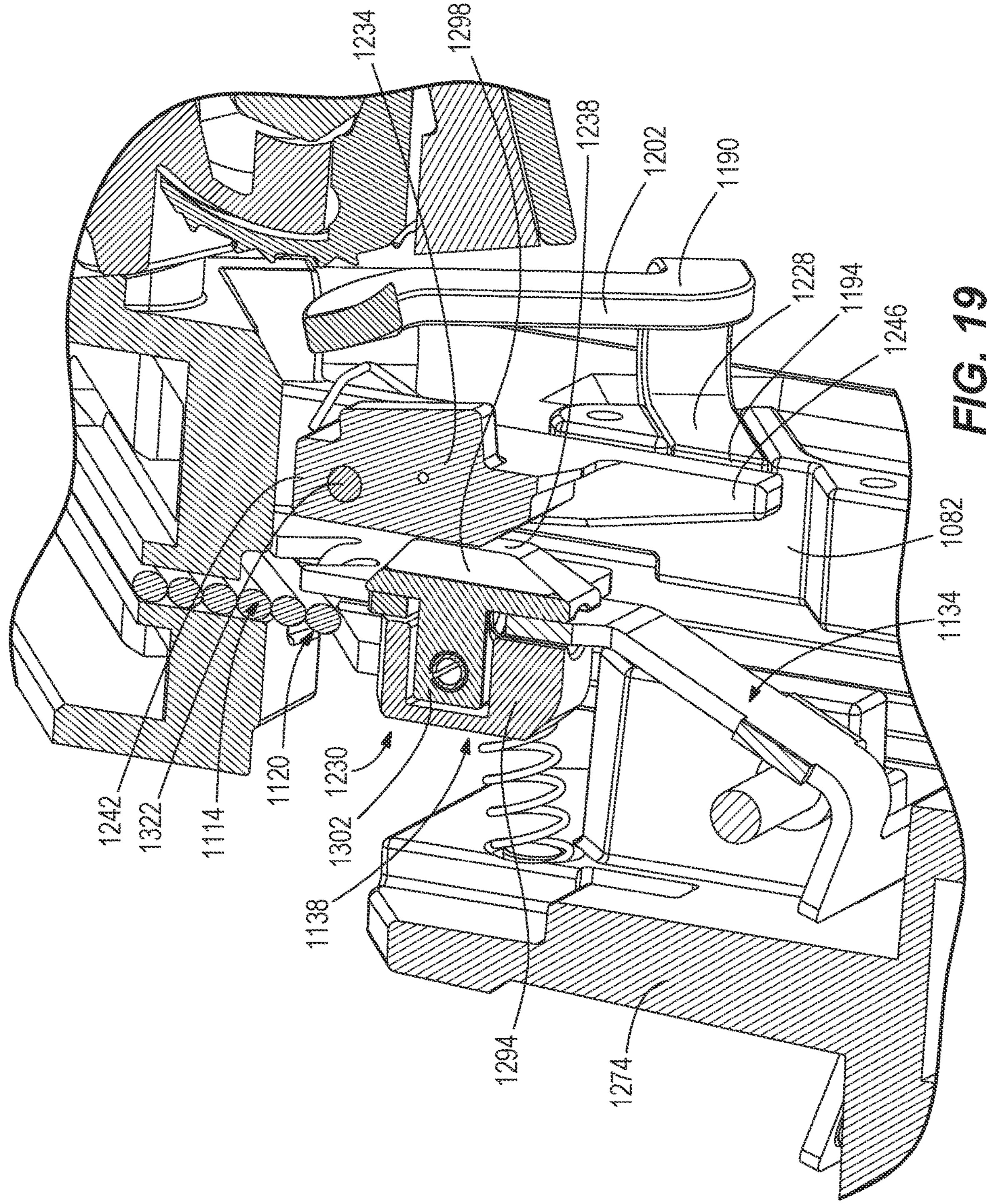
FIG. 19 is another partial cut-away perspective view of the magazine assembly, illustrating the blocking member in a blocked position.

With reference to FIGS. 18-19, the blocking member 1234 is movable (e.g., pivotable) between a first, non-blocking or bypass position, and a second, blocking position. A third spring 1326 (e.g., torsional spring; FIG. 14) is configured to bias the blocking member 1234 toward the bypass position. In particular, the second end portion 1246 of the blocking member 1234 does not overlie the groove 1250 when the blocking member 1234 is in the bypass position. When the blocking member 1234 is in the blocking position, the second end portion 1246 of the blocking member 1234 blocks the end 1194 of the workpiece contact element 1190 where it interferes with retraction of the workpiece contact element 1190, which is a prerequisite for initiating a fastener firing cycle. More specifically, the second end portion 1246 extends into a path of the engagement portion 1228 in order to prevent movement of the workpiece contact element 1190 out the page from the frame of reference of FIG. 19. In other words, the second end portion 1246 of the blocking member 1234 overlies the groove 1250 when the blocking member 1234 is in the blocked position. In some embodiments, the movement of the workpiece contact element 1190 along the longitudinal axis 1074 is stopped completely by the second end portion 1246 of the blocking member 1234 when the blocking member 1234 is moved toward the second position.

The lockout member 1238 is integral with the second portion 1138 of the pusher assembly 1130. The illustrated lockout member 1238 is a face of the second housing member 1298 of the second portion 1138. The lockout member 1238 is selectively engageable with the second end portion 1246 of the blocking member 1234 for moving the blocking member 1234 from the first position toward the second position against the bias of the third spring 1326. More specifically, the lockout member 1238 is configured to move the blocking member 1234 toward the second position where the blocking member 1234 is configured to block movement of the workpiece contact element 1190 when a predetermined number of fasteners (e.g., 0, 1, 2, etc.) remain in the magazine assembly 1014. The predetermined number of fasteners remaining may be twelve or less. For example, in some embodiments, the predetermined number of fasteners may be 1, 2, 3, etc. In other embodiments, the predetermined number of fasteners may be zero. In the illustrated embodiment, the predetermined number of fasteners is five.

Still further, in some embodiments, the lockout member 1238 is configured to move the blocking member 1234 toward the second position when a predetermined range of number of fasteners remain in the magazine assembly 1014. As such, the movement of the blocking member 1234 from the first position toward the second position may occur throughout the predetermined range of number of fasteners remaining in the magazine assembly 1014. The predetermined range of number of fasteners remaining has a lower limit and an upper limit. In particular, the lockout member 1238 begins to move the blocking member 1234 toward the second position when the number of fasteners remaining in the magazine assembly 1014 reaches the upper limit. The blocking member 1234 has been moved closer to the second position than the first position by the lockout member 1238 when the number of fasteners remaining is proximate or has reached the lower limit.

In some embodiments, the lower limit may be one, two, three, etc. and the upper limit may be ten, eleven, twelve, etc. For example, in some embodiments, the lower limit is one and the upper limit is twelve such that the predetermined range of number of fasteners remaining is between one and twelve fasteners. In other embodiments, the lower limit is three and the upper limit is nine such that the predetermined range of number of fasteners remaining is between three and nine fasteners. Accordingly, the blocking member 1234 is moved from the first position toward the second position as the number of fasteners remaining in the magazine assembly 1014 drops from the upper limit to the lower limit (i.e., as the driver 10 is being fired).

The retraction of the workpiece contact element 1190 may be blocked when any one of the number of fasteners remaining is reached within the predetermined range of number of fasteners (i.e., between the upper limit and the lower limit). For example, if the predetermined range of number of fasteners remaining is between three and nine, the locking member 1238 engages with the blocking member 1234 to begin to move the blocking member 1234 toward second position when the number of fasteners remaining is nine. The lockout member 1238 continues to engage with the blocking member 1234 to move the blocking member 1234 toward the second position as the number of fasteners remaining drops from nine fasteners toward three fasteners. The blocking member 1234 does not reach the second position until the number of fasteners remaining is proximate the lower limit of three nails remaining, but the blocking member 1234 may be moved enough toward the second position such that the retraction of the workpiece contact element 1190 is blocked when the number of fasteners remaining is at any one of the number of fasteners remaining between three fasteners remaining and nine fasteners remaining.

In operation, with more than the predetermined number of fasteners in the magazine assembly 1014, the first and second portions 1134, 1138 of the pusher assembly 1130 move in unison, biased by the first spring 1142, toward the first end 1086 of the magazine body 1082 in an incremental manner as consecutive fasteners from the collated fastener strip are discharged from the nosepiece assembly 1150. At this time, the blocking member 1234 remains in a bypass position, in which the blocking member 1234 does not overlie the groove 1250, which allows for the workpiece contact element 1190 to retract in response to being depressed against a workpiece to enable actuation of the fastener driver 1010.

In a scenario when the predetermined number of fasteners remaining in the magazine assembly 1014 is reached, the lockout member 1238 engages the second end portion 1246 and pivots the blocking member 1234 from the bypass position toward the blocking position against the bias of the third spring 1326 (FIG. 19). Upon reaching the blocking position, the second end portion 1246 of the blocking member 1234 overlies the groove 1250 such that the blocking member 1234 blocks the end 1194 of the end portion 1228 of the workpiece contact element 1190, and retraction of the workpiece contact element 1190 is inhibited (i.e., by engagement between the second end portion 1246 and the engagement portion 1228 of the workpiece contact element 1190) in order to prevent further activation of the powered fastener driver 1010. In this scenario, movement of the pusher assembly 1130 may remain in the first state (i.e., with the first and second portions 1134, 1138 moving together in unison) up until the blocking member 1234 is moved to the blocking position.

However, in a scenario in which fasteners of specific sizes (e.g., fasteners having a specific shank length or diameter) are placed in the magazine assembly 1014, when the predetermined number of fasteners remaining in the magazine assembly 1014 is reached, the skewed collated fastener strip within the fastener channel 1114 may only permit the lockout member 1238 to partially move the blocking member 1234 toward the blocking position. That is, the blocking member 1234 may be moved to an intermediate position between the bypass position and the blocking position, in which the second end portion 1246 only slightly blocks the end 1194 of the workpiece contact element 1190. In addition, other tolerances associated with the specific sized fasteners used, and/or associated with the driver 1010 as a whole, may cause the blocking member 1234 to move to the intermediate position. With the blocking member 1234 in the intermediate position, it is possible for the workpiece contact element 1190 to nominally engage the second end portion 1246 during retraction and pivot the blocking member 1234 back toward the bypass position, permitting continued retraction of the workpiece contact element 1190 to enable a fastener firing cycle. In this scenario, movement of the pusher assembly 1130 transitions from the first state to the second state (i.e., with the first portion 1134 moving relative to the second portion 1138 against the bias of the second spring 1146) after the blocking member 1234 is moved to the intermediate position.

Because the first portion 1134 of the pusher assembly 1130 is movable relative to the second portion 1138 and continually biased toward the first end 1086 of the magazine body 1082 by the first spring 1142, the first portion 1134 of the pusher assembly 1130 may continue to move toward the first end 1086 of the magazine body 1082 even if the second portion 1138 of the pusher assembly 1130 is stopped due to engagement between the lockout member 1238 and the blocking member 1234. Therefore, the first portion 1134 of the pusher assembly 1130 can push an individual fastener in the collated fastener strip into the firing channel 1166, despite the blocking member 1234 being in an intermediate position between the bypass and blocking positions, preventing a “dry-fire” cycle in which the driver blade 1026 is driven from the TDC position to the BDC position without a fastener in the firing channel 1166.

Like the first embodiment of the dry-fire lockout assembly 230, after one or two like firing cycles after the predetermined number of fasteners has been reached, the second portion 1138 of the pusher assembly 1130 (having the lockout member 1238) is permitted to move far enough toward the first end 1086 of the magazine body 1082 to fully pivot the blocking member 1234 to the blocking position, thereby inhibiting retraction of the workpiece contact element 1190 and preventing further fastener firing cycles.

Although the invention has been described in detail with reference to certain preferred embodiments, variations and modifications exist within the scope and spirit of one or more independent aspects of the invention as described.

Various features of the invention are set forth in the following claims.

What is claimed is:

1. A fastener driver comprising:

a magazine assembly configured to receive fasteners;

a nosepiece assembly including a channel from which consecutive fasteners from the magazine assembly are driven;

a pusher assembly slidably coupled to the magazine assembly, the pusher assembly configured to bias the fasteners within the magazine assembly toward the channel, the pusher assembly including a first portion and a second portion selectively coupled for movement with the first portion, the pusher assembly adjustable between a first state in which the first portion and the second portion are coupled for movement together toward the channel, and a second state in which the first portion moves relative to the second portion toward the channel;

a workpiece contact element movable relative to the nosepiece assembly between an extended position and a retracted position; and a dry-fire lockout assembly including a blocking member coupled to the magazine assembly, and a lockout member selectively engageable with the blocking member for moving the blocking member from a first position in which the workpiece contact element is configured to slide past the blocking member, and a second position in which the blocking member inhibits movement of the workpiece contact element when a predetermined number of fasteners remain in the magazine assembly, wherein the lockout member is integral with the second portion of the pusher assembly, and wherein the pusher assembly is configured to transition from the first state to the second state after the predetermined number of fasteners remain in the magazine assembly.

2. The fastener driver of claim 1, wherein the magazine assembly includes a window, and wherein, when the blocking member is in the second position, an end portion of the blocking member is received in the window.

3. The fastener driver of claim 2, wherein the end portion is engageable with the workpiece contact element when the end portion is received in the window.

4. The fastener driver of claim 1, wherein the blocking member includes a first end portion and a second end portion opposite the first end portion, wherein the first end portion is pivotably coupled to a body of the magazine assembly, and wherein the second end portion is selectively engageable with the workpiece contact element.

5. The fastener driver of claim 1, wherein the magazine assembly includes a body and a projection extending outwardly from a side of the body, wherein the projection defines a recess, and wherein the blocking member is positioned within the recess.

6. The fastener driver of claim 5, wherein the magazine assembly further includes a window positioned on the side of the body and in communication with the recess, and wherein an end portion of the blocking member is selectively receivable within the window.

7. The fastener driver of claim 5, wherein the magazine assembly includes a fastener channel extending along a length thereof in which the fasteners are stored, and wherein the recess extends parallel to and in communication with the fastener channel.

8. The fastener driver of claim 1, wherein the lockout member is a projection extending outwardly from the second portion of the pusher assembly.

9. The fastener driver of claim 1, further comprising a first spring and a second spring, wherein each of the first spring and the second spring is configured to bias the first portion and the second portion, respectively, toward the channel independent of each other.

10. The fastener driver of claim 9, further comprising a third spring configured to bias the blocking member toward the first position.

11. The fastener driver of claim 1, wherein the magazine assembly includes a fastener channel extending along a length thereof in which the fasteners are stored, and wherein the first portion is positioned closer to the channel of the nosepiece assembly within the fastener channel than the second portion.

12. A fastener driver comprising:

a magazine assembly including a fastener channel extending along a length thereof and configured to receive fasteners, and a window positioned on a side of the magazine assembly;

a nosepiece assembly including a channel from which consecutive fasteners from the magazine assembly are driven;

a pusher assembly slidably positioned in the fastener channel, the pusher assembly configured to bias the fasteners within the magazine assembly toward the channel, the pusher assembly including a first portion and a second portion selectively coupled for movement with the first portion, the pusher assembly adjustable between a first state in which the first portion and the second portion are coupled for movement together toward the channel, and a second state in which the first portion moves relative to the second portion toward the channel;

a workpiece contact element movable relative to the nosepiece assembly between an extended position and a retracted position; and a dry-fire lockout assembly including a blocking member coupled to the magazine assembly, an end portion of the blocking member selectively receivable within the window, the end portion biased by a spring toward the fastener channel and away from the window, and a lockout member selectively engageable with the blocking member for moving the blocking member from a first position in which the workpiece contact element is configured to slide past the blocking member, and a second position in which the end portion of the blocking member is positioned in the window to inhibit movement of the workpiece contact element when a predetermined number of fasteners remain in the magazine assembly, wherein the lockout member is integral with the second portion of the pusher assembly, and wherein the pusher assembly is configured to transition from the first state to the second state after the predetermined number of fasteners remain in the magazine assembly.

13. The fastener driver of claim 12, wherein the blocking member is pivotably coupled to a body of the magazine assembly.

14. The fastener driver of claim 12, wherein the magazine assembly includes a projection extending outwardly from the side of the magazine assembly, wherein the projection defines a recess, and wherein the blocking member is positioned within the recess.

15. The fastener driver of claim 14, wherein the window is in communication with the recess.

16. The fastener driver of claim 14, wherein the recess extends parallel to and in communication with the fastener channel.

17. The fastener driver of claim 12, wherein the lockout member is a projection extending outwardly from the second portion of the pusher assembly.

18. The fastener driver of claim 12, further comprising a second spring and a third spring, wherein each of the second spring and the third spring is configured to bias the first portion and the second portion, respectively, toward the channel independent of each other.

19. The fastener driver of claim 12, wherein the first portion is positioned closer to the channel of the nosepiece assembly within the fastener channel than the second portion.

20. The fastener driver of claim 12, wherein the magazine assembly includes a recess extending parallel to and in communication with the fastener channel, wherein the lockout member extends outwardly from the fastener channel toward the recess, and wherein an end of the lockout member is positioned in the recess.

* * * * *